(12) United States Patent
Tu et al.

(10) Patent No.: US 11,176,631 B1
(45) Date of Patent: Nov. 16, 2021

(54) GPU-BASED PARALLEL INDEXING FOR CONCURRENT SPATIAL QUERY

(71) Applicant: UNIVERSITY OF SOUTH FLORIDA, Tampa, FL (US)

(72) Inventors: Yicheng Tu, Tampa, FL (US); Zhila Nouri Lewis, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 149 days.

(21) Appl. No.: 16/451,295

(22) Filed: Jun. 25, 2019

Related U.S. Application Data

(60) Provisional application No. 62/726,557, filed on Sep. 4, 2018.

(51) Int. Cl.
| | |
|---|---|
| *G06T 1/20* | (2006.01) |
| *G06F 9/38* | (2018.01) |
| *G06F 9/50* | (2006.01) |
| *G06T 17/00* | (2006.01) |

(52) U.S. Cl.
CPC .............. *G06T 1/20* (2013.01); *G06F 9/3877* (2013.01); *G06F 9/5061* (2013.01); *G06T 17/005* (2013.01)

(58) Field of Classification Search
CPC .................................................. G06T 17/005
See application file for complete search history.

(56) References Cited

U.S. PATENT DOCUMENTS

| | | | |
|---|---|---|---|
| 6,597,359 B1* | 7/2003 | Lathrop | G06T 15/06 345/420 |
| 2004/0095343 A1* | 5/2004 | Forest | G06T 17/20 345/419 |
| 2004/0111420 A1* | 6/2004 | Hofstee | G06F 16/2255 |
| 2005/0195191 A1* | 9/2005 | Lee | G06T 9/40 345/424 |
| 2009/0167763 A1* | 7/2009 | Waechter | G06T 17/005 345/426 |
| 2010/0082703 A1* | 4/2010 | Zhou | G06F 16/9027 707/803 |
| 2011/0193859 A1* | 8/2011 | Kim | G06T 17/005 345/419 |
| 2015/0262416 A1* | 9/2015 | Hecht | G06T 15/08 345/424 |
| 2016/0071315 A1* | 3/2016 | Cohen | G06T 15/30 345/419 |
| 2018/0114357 A1* | 4/2018 | Shane | G06T 17/005 |

FOREIGN PATENT DOCUMENTS

| | | |
|---|---|---|
| KR | 101382945 | 4/2014 |

OTHER PUBLICATIONS

You, Simin; et al. "Parallel spatial query processing on gpus using r-trees." Proceedings of the 2nd ACM SIGSPATIAL International Workshop on Analytics for Big Geospatial Data. 2013.

(Continued)

*Primary Examiner* — Phi Hoang
(74) *Attorney, Agent, or Firm* — Quarles & Brady LLP

(57) ABSTRACT

Disclosed are various embodiments for GPU-based parallel indexing for concurrent spatial queries. A number of nodes in a tree to be partitioned is determined. The tree is then iteratively partitioned with the GPU. Nodes are created with the GPU. Finally, a point insertion is performed using the GPU.

20 Claims, 16 Drawing Sheets

(56) References Cited

OTHER PUBLICATIONS

Fang, Rui, et al. "GPUQP: query co-processing using graphics processors." Proceedings of the 2007 ACM SIGMOD International conference on Management of data. 2007.

Luo, Lijuan; et al. "Parallel implementation of R-trees on the GPU." 17th Asia and South Pacific Design Automation Conference. IEEE, 2012.

Geiger, Adolf; et al. "Human fibrocyte-derived exosomes accelerate wound healing in genetically diabetic mice." Biochemical and biophysical research communications 467.2 (2015): 303-309.

Zhang, Jianting; et al. "Parallel online spatial and temporal aggregations on multi-core CPUs and many-core GPUs." Information Systems 44 (2014): 134-154.

Shabbir, Arsalan, et al. "Mesenchymal stem cell exosomes induce proliferation and migration of normal and chronic wound fibroblasts, and enhance angiogenesis in vitro." Stem cells and development 24.14 (2015): 1635-1647.

Zhang, Jianting; et al. "Parallel quadtree coding of large-scale raster geospatial data on GPGPUs." Proceedings of the 19th ACM SIGSPATIAL International Conference on Advances in Geographic Information Systems. 2011.

Rani, Sweta; et al. "The Exosome—A Naturally Secreted Nanoparticle and its Application to Wound Healing." Advanced materials 28.27 (2016): 5542-5552.

Kim, Jinwoong; et al. "Parallel multi-dimensional range query processing with R-trees on GPU." Journal of Parallel and Distributed Computing 73.8 (2013): 1195-1207.

\* cited by examiner

Fig. 2 Overview of G-PICS framework

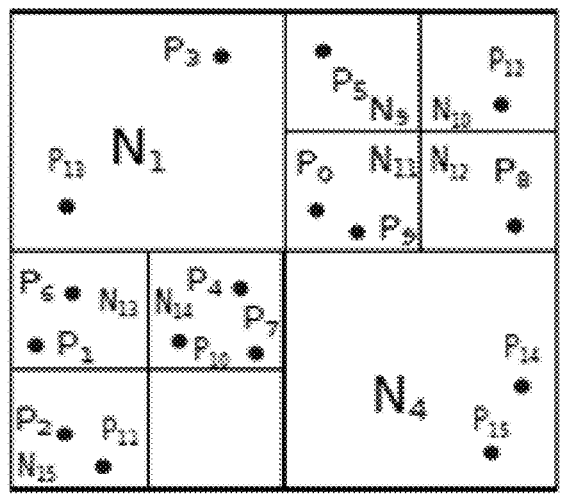 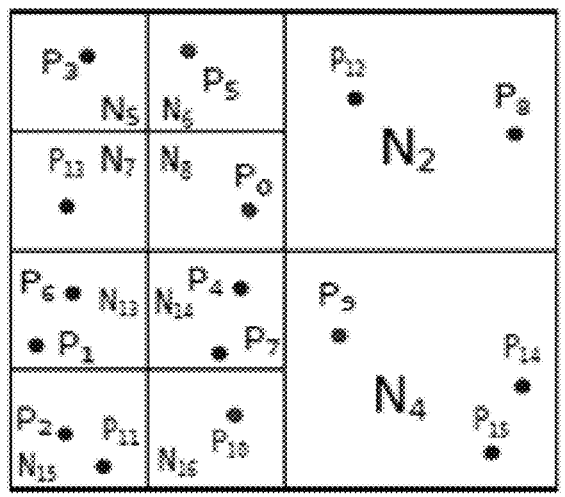
(a) Tree structure before movement  (b) Tree structure after movement
FIG. 10

GPU-BASED PARALLEL INDEXING FOR CONCURRENT SPATIAL QUERY

CROSS-REFERENCE TO RELATED APPLICATIONS

This application claims priority to and the benefit of U.S. Provisional Patent Application No. 62/726,557, entitled "GPU-BASED PARALLEL INDEXING FOR CONCURRENT SPATIAL QUERY" and filed on Sep. 4, 2018, which is incorporated by reference as if set forth herein in its entirety.

GOVERNMENT LICENSE RIGHTS

This invention was made with government support under 1253980 awarded by the National Science Foundation. The government has certain rights in the invention.

BACKGROUND

Spatio-temporal data has become a critical element in a broad range of applications such as geographic information systems, mobile computing, scientific computing, and astrophysics. Due to the high data volume and large query quantities, support for efficient spatial data storage and query processing has become a vital component in such systems. Popular spatial queries are spatial point search, range search, within-distance search, and k-nearest neighbors (kNNs). Previous work has also demonstrated the great potential of parallel computing in achieving high performance query processing. However, if parallelism is adopted without spatial data indexing in query processing, the performance gain obtained will fade away quickly as data size increases.

Over the last decade, many-core hardware has been widely used to speed up high-performance computing (HPC) applications. Among them, Graphical Processing Units (GPUs) have become a mainstream platform. Spatial query processing on GPUs has also attracted much attention from the research community. Work in this field often focuses on parallelizing one search query at a time on GPUs.

BRIEF DESCRIPTION OF THE DRAWINGS

For a more complete understanding of the embodiments and the advantages thereof, reference is now made to the following description, in conjunction with the accompanying figures briefly described as follows:

FIG. 10 illustrates an example of updating a quadtree with MC=3 and MH=3, according to various embodiments of the present disclosure.

Figure 1:
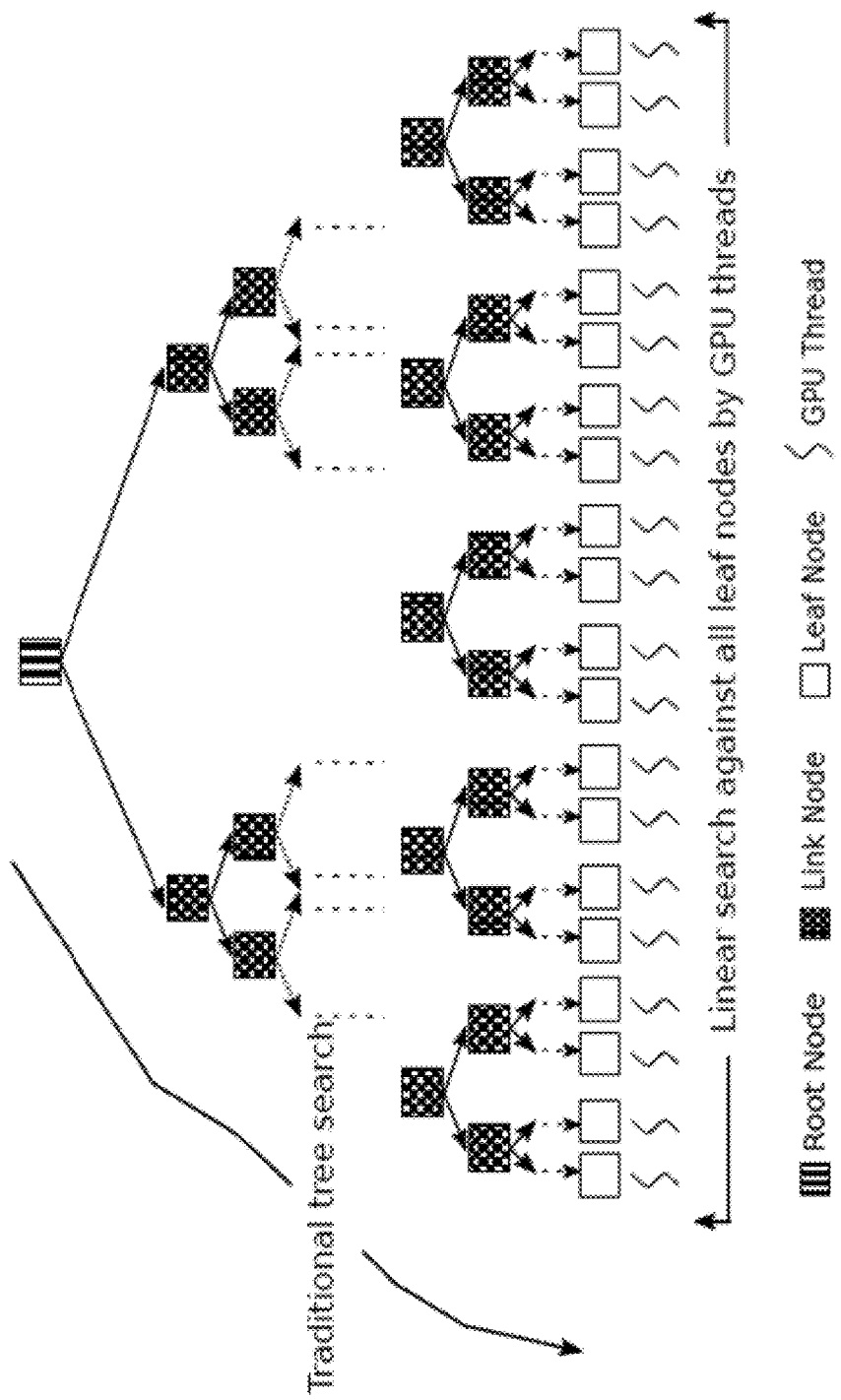
FIG. 1 illustrates an example of traditional tree search versus parallel linear search against all leaf nodes in STIG, according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Disclosed are various embodiments for a framework for graphics processing unit (GPU) based spatial indexing and query processing. These embodiments provide a more comprehensive spatial indexing framework with even better performance than previous frameworks. Likewise, these embodiments also support functionality beyond query processing. To accomplish these goals, several issues are addressed.

High Performance in Tree Construction and Query Processing: In all the aforementioned work, a spatial tree consists of intermediate nodes, and a set of leaf blocks to store the spatial data records in consecutive memory locations. A two-step spatial query processing strategy is adopted in such work: (1) all leaf blocks are searched in a brute-force manner to identify those that satisfy the search conditions; and (2) all data points in the identified leaf blocks are examined to determine the final results. It is not easy to achieve a high degree of parallelism in the first step using traditional logarithmic tree search, especially when higher levels of the tree are visited. Hence, they adapt a data parallel solution for the first step on GPU, in which all the leaf blocks are transferred to GPU and scanned in a brute-force manner. However, by scanning all leaf nodes, such an approach is inefficient as it literally changes the total amount of work (work efficiency) from logarithmic to linear time (FIG. 1). Although they take advantage of the thousands of GPU cores to process leaf nodes concurrently, the speedup can be quickly offset by the growing number of leaf nodes in large datasets. In GAT, to achieve a logarithmic work efficiency, the first step is done on CPU by using a quadtree-based filtering method. Then, only the leaf blocks identified in the first step are transferred to GPU, and the second step is parallelized on GPU. Although the overall query processing performance is improved in GAT, it still suffers from the overhead caused by transferring the intersecting leaf blocks to GPU's global memory thus has much room for improvement.

Handling Data Updates: An essential element that is missing from existing work is the support of data updates. In such work, the tree is constructed in host memory and transferred to GPU's global memory. In large datasets, building a tree is costly, and furthermore, the overhead of transferring data from CPU to GPU is significant. For static data, it is not an essential issue as tree construction and transferring is a one-time cost. However, almost all location-based services involve dynamic data. Without explicitly handling tree updates as in existing work, the tree will have to be rebuilt and transferred to the GPU every time there is update of data.

Multi-GPU Support: With today's data-intensive applications, efficient support for datasets that cannot fit into the GPU's global memory is necessary. To address that, GAT uses a memory allocation table (MAT) to keep track of the leaf blocks residing in global memory. Therefore, before a query is launched on GPU, the MAT is first checked to see if queries' intersecting leaf blocks are in global memory. If not, such blocks have to be copied to global memory before query processing. In case the global memory does not have enough capacity for new leaf blocks, following a least-recently used (LRU) swapping strategy, some leaf blocks are swapped out from global memory to make capacity for new blocks. Therefore, each time the overhead of transferring data from host memory to GPU memory is added to query processing. Thus, an essential step towards developing high performance spatial query processing in large datasets, is to reduce such overhead.

Multi-Query Optimization: In existing approaches, by processing one query at a time, optimization opportunities among different queries in a workload are wasted. For example, in the second step of the search, since each query scans a list of leaf nodes to find their data records, the same data record can be accessed many times by different queries in a workload. Consequently, the program easily hits a performance ceiling due to congestion of global memory while other high performance resources are either insufficiently utilized or largely unused (e.g., shared memory). Another drawback of these approaches is that query processing cannot proceed without CPU intervention.

Many location-based applications are busy systems with very high query arrival rate. For example, in scientific simulations such as molecular and astrophysical simulations, millions of spatial queries such as kNNs and range searches are issued at every step of the simulation. Therefore, there are optimization opportunities in co-processing concurrent queries. GAT can be extended to support processing more than one query at a time by parallelizing each individual input query using the solution introduced in GAT. However, in this approach the number of queries that can be run simultaneously is limited to those that their intersecting leaf blocks can fit in GPU's global memory. Therefore, the degree of parallelism is low and this approach cannot be used in query processing systems with high query arrival rate.

Accordingly, various embodiments of the present disclosure provide a GPU-based Parallel Indexing for Concurrent Spatial data processing (G-PICS) framework for high high performance spatial data management and concurrent query processing. G-PICS is implemented as an extensible software package that supports various types of spatial trees under different hardware (GPU) specifications. Query processing approach in G-PICS bears logarithmic work efficiency for each query yet overcomes the problem of low parallelism. Therefore, instead of parallelizing a single tree-search operation, another strategy is to parallelize multiple queries running concurrently. Batched query processing, due to the effective sharing of computing resources, has been heavily studied in the database field and is often utilized for large-scale web search on GPUs. The batch query processing approach in described herein achieves task parallelism on GPUs, allowing each thread to run an individual query. A search query can therefore be done in logarithmic steps. Because each query carries roughly the same work and is independent to others, it is easy to justify the use of parallel hardware.

Figure 2:
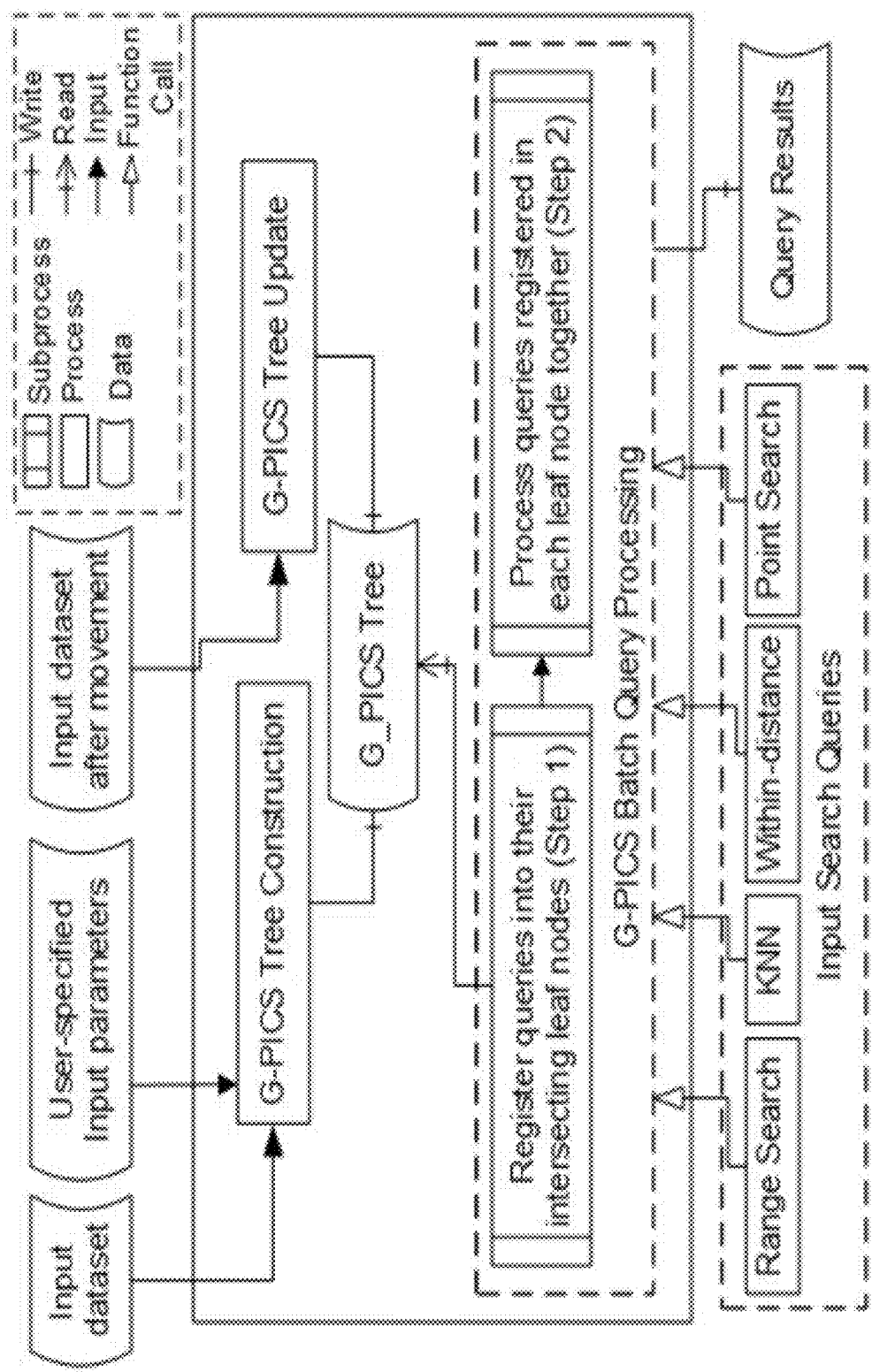
FIG. 2 illustrates an example of an overview of the G-PICS framework, according to various embodiments of the present disclosure.

G-PICS encapsulates all the key components for efficient parallel query processing within GPU with little CPU intervention. It includes highly efficient parallel algorithms for constructing a wide range of space partitioning trees based on user-input parameters. For example, users can choose to build trees with different node degrees and node partitioning method (e.g., space-driven or data driven). G-PICS provides APIs for processing major spatial queries including spatial point search, range search, within-distance search, and kNNs. Such APIs enable efficient development of more complex spatial data retrieval algorithms and applications. FIG. 2 shows an overview of G-PICS framework.

G-PICS processes a group of spatial queries at a time, with each query assigned to a thread. Similar to existing work, query processing is accomplished in two steps. In the first step, following a traditional tree search approach, the leaf node(s) that contain the resulting data of each query are identified. However, instead of retrieving all the resulting data, each query can only be registered to its corresponding leaf nodes. In the second step, following a query-passive design, the data in each leaf node is scanned only once and distributed to the list of queries pre-registered with that leaf node. The highly-organized access to data records yields great locality therefore can make good use of GPU cache.

Meanwhile, all the accesses to the global memory are coalesced. The effectiveness of GPICS has been validated with comprehensive experiments. The experimental results show performance boosts up to 80× (in both throughput and query response time) over best-known parallel GPU and parallel CPU-based spatial query processing systems. The G-PICS tree construction algorithms remarkably outperform the best-known parallel GPU-based algorithms—speedup up to 53× is reported. Moreover, tree update procedure outperforms the tree construction from scratch even under very high rate of data movement (up to 16×). GPICS takes advantage of multiple GPU cards in a system to support large datasets with good scalability—by increasing the number of GPUs, resulting in almost linear speedup.

In the past decade, GPUs are used to speed up computational tasks in many application domains. In the database field, GPUs are used to implement relational operators such as aggregates and join. Significant speedups were reported as the result of integrating GPUs with databases in processing spatial operations.

The needs of many applications require efficient data storage and retrieval via spatial indexes (space-partitioning trees) such as quadtree, and k-d tree. Space-partitioning trees are hierarchical data structures in which a certain space is recursively divided into subregions. There are two groups of space-partitioning trees: data-driven, and space-driven. In the data-driven scheme, space partitioning is based on the input data, versus in space-driven the partitioning is only based on the space-specific rules. Selection of the appropriate space partitioning tree for indexing the input data highly depends on the input data type and the search applications. For example, due to the highly balanced aspect ratio in space-driven partitioning trees, these trees are highly qualified for a large number of applications such as proximity searches, and range searches. In addition, space-driven partitioning trees are well-suited for indexing the uniformly-distributed or dynamic datasets. Moreover, space-driven partitioning trees are shown to be highly compatible with parallel architecture especially GPUs. On the other hand, data-driven partitioning trees can be easily balanced (logarithmic depth) which is optimized for indexing highly skewed datasets.

Early work on GPU-based spatial indexes focused on computer graphics applications, with an aim for efficient triangle partitioning. In most existing work about spatial query processing on GPUs, spatial indexes are constructed on CPU and shipped to GPU for query processing. There are few work that focused on building the tree structure on GPUs. An algorithm for parallel construction of Bounding Volume Hierarchies (BVHs) on GPUs has been developed. Point-Region (PR) quadtrees are simplified variations of BVHs in 2-D space. The idea was later used to convert the PR quadtree construction on GPUs to an equivalent level-by-level bucket sort problem—quadtree nodes are considered as buckets and input data points are sorted into the buckets based on their locations at each level. K-d tree is a data-driven data structure, which is generally constructed level-by-level by dividing data points in each node into two partitions based on the median value of a chosen dimension. The dimensions in the data domain are chosen in a round-robin fashion at consecutive levels of the tree. A parallel algorithm for k-d tree construction on GPUs is presented, in which at each node the median value is selected by sorting the data points in the developing dimension using the CUDA Thrust library. However, sorting does more work than necessary for finding the median value, and performs poorly in dynamic datasets. There is no previous work targeted parallel data updates on spatial trees.

As discussed earlier, the tree is usually constructed in host memory and then transferred to GPU for query processing. Due to the limited CPU computing power and memory bandwidth, the cost of building the tree on host memory is high. Moreover, the overhead of transferring the tree from host to GPU is significant—with its microsecond level latency and 10 GB/s-level bandwidth, the PCI-E bus is the weakest link in the entire GPU computing platform. Therefore, the first step towards enabling G-PICS for efficient spatial query processing lies in efficiently building a tree data structure within the GPU. In G-PICS, support is provided for building space-driven, and data-driven partitioning trees. Moreover, G-PICS supports tree construction for datasets whose sizes are bigger than a single GPU's global memory.

G-PICS is a general framework that supports any space partitioning tree that decomposes the space recursively to generate a fixed number of disjoint partitions each time. To construct a space partitioning tree, a user only needs to provide several parameters as inputs to G-PICS, and such parameters are summarized in Table I. If data points in a node exceeds MC, that node is partitioned into NP equal-sized child nodes. The decomposition continues until there is no more node to partition, or MH of the tree is reached (stopping criteria). Nodes that got partitioned are link (internal) nodes, and others are leaf (data) nodes. G-PICS implements both space-driven and data-driven space partitioning methods to allow construction of a wide range of trees: with space-driven partitioning, point-region (PR) quadtree, region quadtree, PM quadtree, PMR quadtree, MX-PR quadtree, fixed grid, and point-region k-d tree can be built. On the other hand, the data-driven partitioning allow users to build spatial k-d trees and other variants of Binary Space Partitioning trees. By changing the quantity NP, trees with different degrees (e.g., degree 4 for quad-tree) will be obtained.

In space-driven partitioning trees, the space decomposition is totally independent to the dataset. For example, a PR quadtree is a type of trie, in which each link node has at most four children. If data points in a node exceeds MC, that node is partitioned into four equal-sized child nodes. The decomposition continues until the stopping criteria are met. There are unique challenges in the construction of space-driven partitioning trees on GPUs. First, to achieve high efficiency, one requires good utilization of GPU resources, especially the large number of cores. The traditional way for such is done by parallelizing the nodes' partitioning process level by level. Clearly, this approach suffers from low parallelism, especially when building top levels of the tree. Second, the total number of non-empty nodes in such trees is generally not known in advance. This is a major problem in GPUs as dynamic memory allocation on the thread level carries an extremely high overhead. The easiest solution to tackle this problem is to nevertheless allocate memory for empty nodes. This results in inefficient use of (global) memory, which is of limited volume on GPUs, and becomes more crucial when dealing with skewed datasets. Finally, the main design goal of G-PICS trees is to allow efficient query processing. Hence, placing data points in a leaf node in consecutive memory locations is necessary, as it allows coalesced memory access in a data parallel program.

Overview of G-PICS Tree Construction: To address above challenges, a top-down parallel algorithm on GPUs that achieves a high level of parallelism in the tree construction process can be used. Furthermore, various embodiments of the approach described herein avoid empty node expansion, and guarantees coalesced memory access in processing the data points in a leaf node.

G-PICS handles empty nodes by delaying the actual node memory allocation until the exact number of non-empty nodes in the tree is determined. In particular, in the beginning, it is assumed that the tree is a full tree according to its MH—in a full quadtree all the intermediate nodes in the tree have exactly NP children. Let us use a full quadtree (FIG. 3) as an example. The maximum number of nodes in such a tree (NP=4) with height of H can be calculated as $$\sum_{t=0}^{t=(H-1)} 4^t = (4^H - 1)/(4-1) = (4^H - 1)/3.$$

Each node in a full quadtree has an ID, which is assigned based on its position in the tree. Starting from the root node with the ID equals to zero, and allocating the directions based on the children location (ranging from 0 to 3), an ID for each node is determined as follows: $Node_{id}$=(Parent$_{id}$*4)+direction+1, in which Parent$_{id}$ is the ID of the node's parent.

One of the ideas behind G-PICS tree construction is a new parallel algorithm that maintains a high level of parallelism by novel workload assignment to GPU threads. Instead of binding a thread to a tree node, each GPU thread is assigned to one input data point. By that, the process of locating the node to which each point belongs is parallelized. Each thread keeps the ID of such nodes and such IDs are updated at each level till a leaf node is reached. The tree construction (Algorithm 1) is done in three steps: Tree-Partitioning, Node-Creation, and Point-Insertion.

---
Algorithm 1: Space-driven Tree Construction Routine
---
Var: spiltNum (number of nodes to be partitioned) ← 1,
    $C_{node}$ (array to keep current node for data points) ← 0,
    $Cur_{level}$ (current level developing in the tree) ← 1
1: Split[0] ← True
2: while $Cur_{level}$ < MH and splitNum > 0 do
3:   $Cur_{level}$++;
4:   Tree-Partitioning on GPU;
5:   update splitNum
6: end while
7: Node-Creation on GPU;
8: Point-Insertion on GPU;
---

Tree Construction Routines: The Tree-Partitioning kernel (Algorithm 2) is launched with N threads, with each thread working on one data point. Starting from the root node, each thread finds the child node to which its assigned point belongs, saves the child node ID, and increments the counter of the number of points in the child node. Since such counts (e.g., counter array) are shared among all threads, atomic instructions can be used to modify the counts and maintain correctness. When the counts are updated, if a node's data count exceeds MC and MH of the tree has not been reached yet, the corresponding value in the split array will be set, meaning the node should be further partitioned. Upon finishing operations at one level (for all threads), the following information can be seen from auxiliary arrays: current node array indicates the nodes to which data points belong, node counter array reflects the number of data points in each node, and split array indicates if each node has to be partitioned. If there are nodes to be partitioned, the same kernel is launched again to develop the next level of the tree. For example, in FIG. 3, there are two nodes—N2 (with 5 points) and N3 (with 7 points)—to be partitioned when second level of the tree is built. The kernel is relaunched with three new auxiliary arrays, the length of which corresponds to the number of the child nodes of only N2 and N3. Likewise, counter and split values of the nodes in this level are updated. This routine will continue until the stopping criteria are met. Various embodiments of the present disclosure maintain a high level of parallelism by having N active threads at all times.

---
Algorithm 2: Tree-Partitioning on GPU
---
Global Var: Input (array of input data points)
Local Var: t (Thread id)
1: for each Input[t] in parallel do
2:   if Split[$C_{node}$[Input[t]]] == True then
3:     $C_{node}$[Input[t]] ← find position of Input[t] in the children of $C_{node}$[Input[t]]
4:     $L_{cnt}$ ← atomicAdd(Counter[$C_{node}$[Input[t]]], 1)
5:     if $L_{cnt}$ == MC+1 then
6:       Split[$C_{node}$[Input[t]]] ← True
7:     end if
8:   end if
9: end for
---

Figure 3:
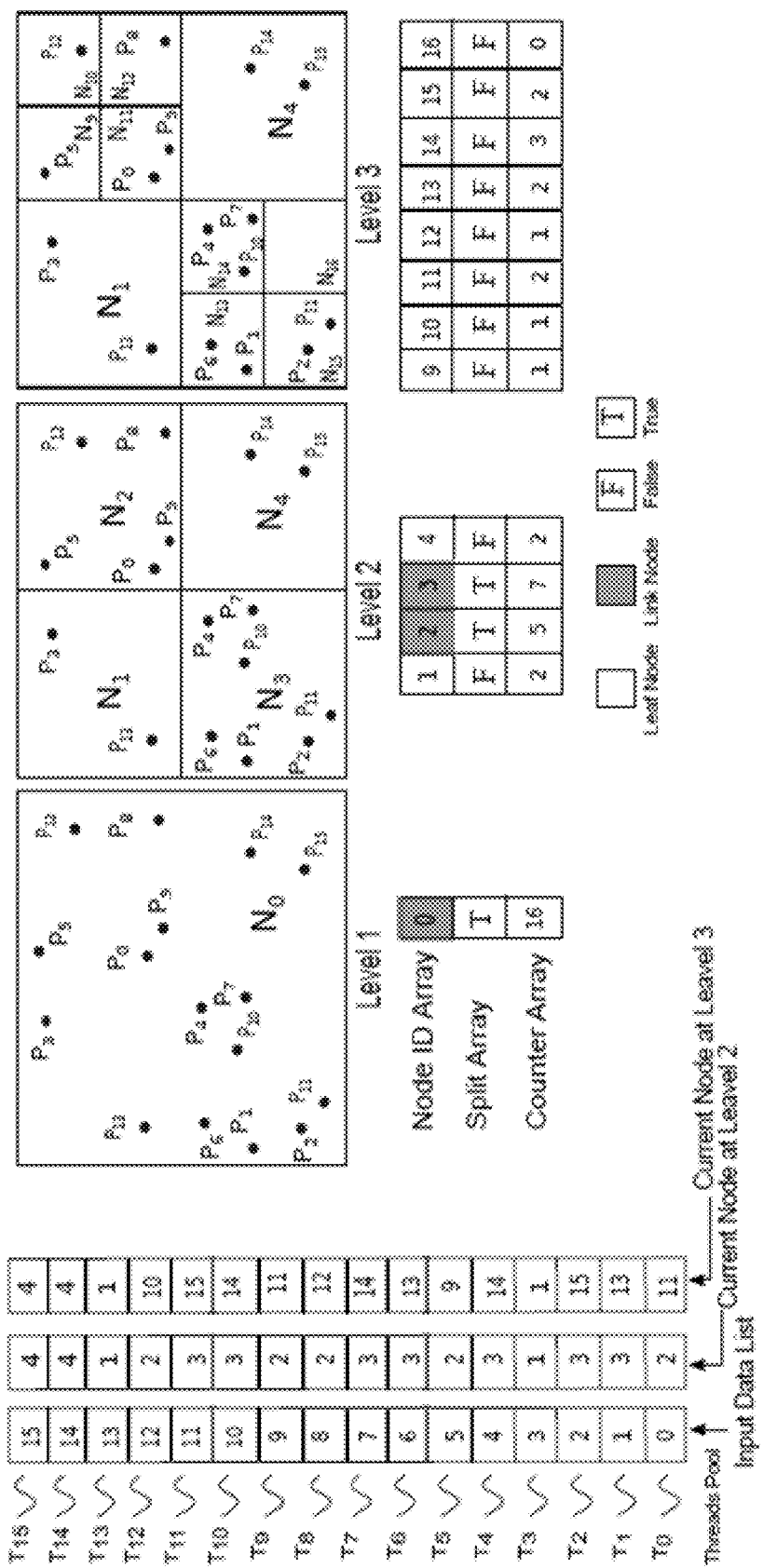
FIG. 3 illustrates an example of quadtree construction in G-PICS with MC=MH=3 that have auxiliary arrays with the length equal to the maximum number of nodes in a full tree allocated on the GPU and deleted when the tree construction is completed, according to various embodiments of the present disclosure.

The Node-Creation kernel (Algorithm 3) is called to create the actual non-empty nodes in the tree. Having finished the previous step, the following information is known: each point has the leaf node to which it belongs, the total number of nonempty nodes in the entire tree with their types (leaf or link), and the total number of points in each leaf node. Therefore, the required information for creating the nodes (in a parallel way and without wasted space) is known. Consequently, the Node-Creation kernel is launched with as many active threads as the number of non-empty nodes, each thread creates a non-empty node. While building nodes, memory for each leaf node's data list is allocated in consecutive memory locations. In FIG. 3, the total number of non-empty nodes is 12 (while the full quadtree has 21 nodes).

---
Algorithm 3: Node-Creation on GPU
---
Global Var: lead$_{datalist}$ (array store leaf nodes data)
Local Var: t (Thread id)
1: for each non-empty $Node_{ID}$[t] in parallel do
2:   create node $Node_{ID}$[t]
3:   if Split[$Node_{ID}$[t]]== False and Counter[$Node_{ID}$[t]] >0 then
4:     Allocate point memory in leaf$_{datalist}$
5:   end if
6: end for
---

Figure 4:
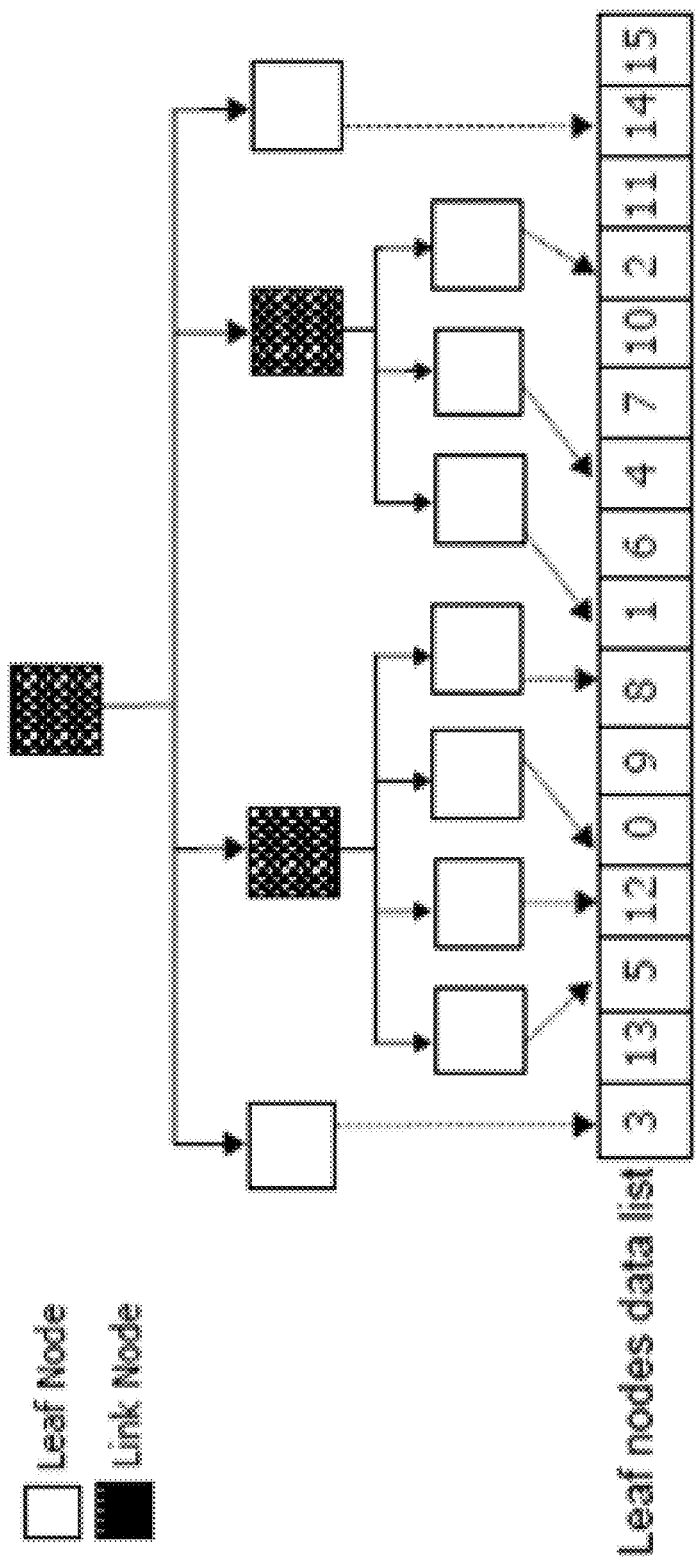
FIG. 4 illustrates a final quadtree built based on the data inputs in FIG. 3, according to various embodiments of the present disclosure.

The Point-Insertion kernel (Algorithm 4) is called to insert the input data points to the tree. Having this setup, all the points in each leaf node are saved in consecutive memory locations. The input data points in a quadtree have two dimensions (x and y). To ensure coalesced memory access in query processing, the data lists should be saved using two arrays of single-dimension values rather than using an array of structures which holds two-dimensional data points. The final quadtree structure built using the aforementioned algorithm is shown in FIG. 4, in which each leaf node points to the beginning of its data list in the leaf nodes data list array.

Algorithm 4: Point-Insertion on GPU

Local Var: t (Thread id)
1: for leach Input[t] in parallel do
2:    insert Input[t] to leaf$_{datalist}$[C$_{node}$[Input[t]]]
3: end for Cost Modeling: The total cost of tree construction can be evaluated using the formula set forth in the following equation:

$$C = C_T + C_I + C_P \qquad (1)$$

where CT, CI, and CP are the costs of Tree-Partitioning, Node-Creation, and Point-Insertion, respectively. Let N be the number of data points, and n the number of tree nodes, then, CT=O(N log N), CI=O(n), and CP=O(N). Although CT is of higher complexity, it is not the main bottleneck in practice. Instead, although CP has a linear complexity, it is the dominating cost in tree construction. This is because Point-Insertion requires concurrent writes into the leaf node's data list, and this should be done via atomic instructions to ensure consistency. Atomic instructions are known to bear a large overhead. For example, experiments show that on average 60 to 70 percent of the tree construction time is spent on the Point-Insertion kernel.

Space decomposition is done based on the spatial distribution of the data to be indexed. A salient example is the spatial k-d tree, where each link node divides the space into two partitions (left and right subtrees) using a splitting hyperplane. Each link node in the tree is affiliated with one of the k-dimensions in the input dataset, with the hyperplane perpendicular to that dimension's axis. For instance in a node with "y" axis as splitting axis, all points in the left subtree have "y" values smaller than those in the right subtree. The splitting plane are chosen following a round-robin fashion. To ensure the tree is balanced, it is required that the pivot value for splitting be the median value of the coordinate values in the axis used to develop the splitting plane in each node. However, there are a number of challenges in building data-driven trees. First, similar to space-driven partitioning trees, previous approaches parallelize the node's partitioning process by assigning each node to one GPU thread, and this causes low parallelism in building higher levels of a tree. Second, the median value for partitioning in each node is usually selected by sorting the data points based on the splitting axis. Sorting is not an efficient way for finding the median value, as the entire sorted list is not required. Again, placing data points belonging to a leaf node in consecutive memory locations is required. Empty node expansions is not an issue in such trees since the partitioning is done based on the input data.

One innovation is a parallel approach for finding the median value of a list of values without sorting. In order to find a median value in an unsorted list, data points in that list are organized into multiple continuous buckets using a range-based histogramming approach. The histogram is designed in a way to divide the input range of data lists into H histogram buckets. Each input data point (Input[i]) is assigned to one histogram bucket based on its location using a linear projection as follows:

$$\frac{(H-1)}{(\max - \min)}(\text{Input}[i] - \min) \qquad (2)$$

where max and min are the maximum and minimum value in the input list, respectively. Each bucket has a counter showing the number of points belonging to that bucket. By assigning the points to histogram buckets, the bucket that contains the median value can be determined based on the buckets' counter values. Thus, only that bucket will be sorted in order to find the median value. This approach eliminates extra candidates for sorting. In order to assign points to histogram buckets, each data point in a list is assigned to one GPU thread to find the bucket to which it belongs. As a result, this approach achieves a high level of parallelism.

Figure 5:
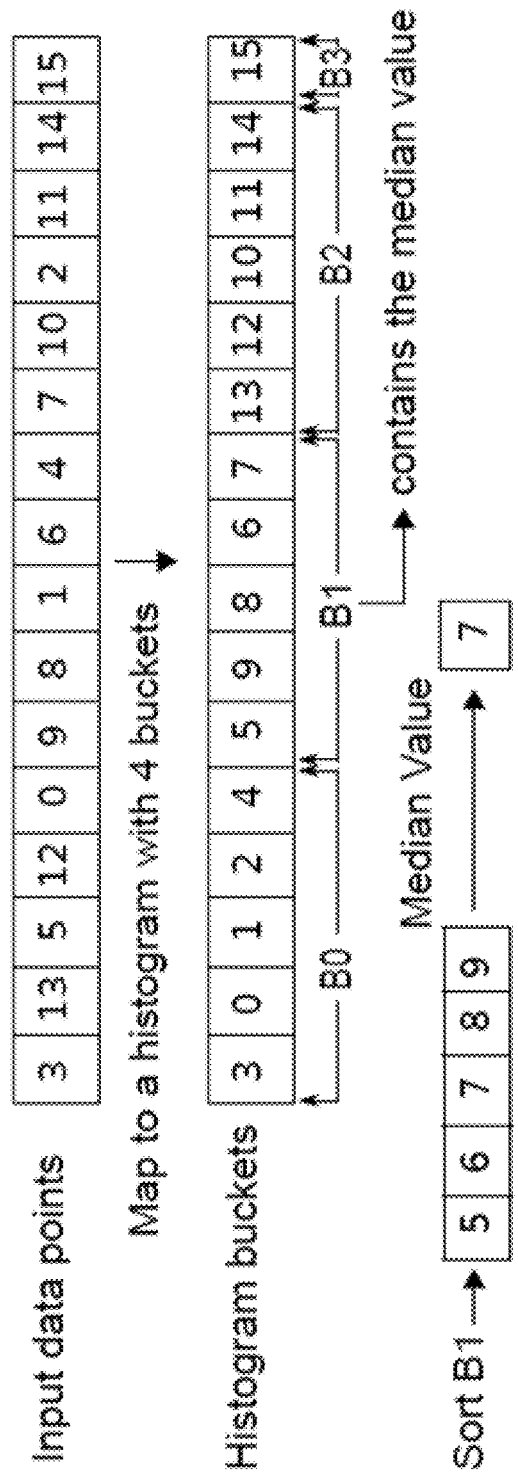
FIG. 5 illustrates an example of finding the median value via histogramming, according to various embodiments of the present disclosure.

However, one bottleneck lies in updating the counter values for each bucket by concurrent threads. To avoid race condition, atomic instructions have to be used for such updates yet atomic instructions are executed in a sequential manner. For that, an output privatization technique for outputting the histogram buckets' counters can be adopted. Specifically, private copies of bucket counters are stored in on-chip cache called shared memory to be accessed by a subset of the threads. The private copies of the histogram are combined into the global histogram. After generating the final histogram output, the bucket that has the median value can be identified by reduction of counter values—median should divide the input list into two lists with equal size. Consequently, just the points in that bucket need to be sorted to find the median value. Two strategies can be utilized for such sorting. If the number of points in that bucket are small enough to fit into shared memory, the sorting is done in shared memory using an efficient in-place fast shared memory sorting. If the size of the input list is larger than shared memory, the sorting can be done using fast Radix sort libraries available in CUDA libraries such as Thrust or CUDPP. After sorting the points in the determined bucket, the median value in the input list is determined (FIG. 5).

G-PICS k-d tree construction follows a level-by-level approach on GPUs to maximize the level of parallelism. At higher levels of the tree, every node in the developing level is assigned to a GPU thread, which launches another kernel using CUDA dynamic parallelism to perform the node partitioning. To partition a node, the median value in the developing dimension's axis is determined following the approach mentioned earlier. Having determined the median value, points can be organized into the sub-list (left and right) to which they belong. However, moving data points into sub-lists is not in-place, and consists a lot of atomic operations in global memory to find the next available pointer in each sub-list. To tackle such issue, in each GPU block, two private counters are defined in shared memory. Using the private counters, the total number of points belonging to each sub-list in each block is determined. Then, the private counters are used to increment the global counters in global memory. After moving data points to the sub-lists, nodes can be created. If the stopping criteria are met, a node is a leaf node; otherwise it is a link node and should get split in building the next level of the tree. On the other hand, in the lower levels of the tree, the same approach is followed, however, each node that has to get partitioned is assigned to one GPU block for partitioning.

Up to this point, it has been assumed that the entire tree plus all the data can fit into one GPU's global memory. For datasets with size beyond that, multiple GPUs should be used. The main challenge is to minimize data synchronization and communication among GPUs. For example, in order to determine whether a node should be split, summation of the auxiliary array values from all GPUs is required. A CPU master approach can use the CPU to perform such synchronization and communication. Specifically, all GPUs send their local copies of run-time parameters to the host CPU, and the CPU conducts a parallel reduction to get the global value and send the results back to the GPUs. However, the CPU master approach requires a lot of communications to transfer the parameters between all GPUs and CPU through PCI-E bus, which has low bandwidth and high latency. In addition, due to limited parallel computing resources, the reduction operation is much slower on the CPU. To overcome such limitations, a GPU master approach can be taken, in which one GPU becomes the central control, and all other GPUs send their local copies to the master GPU to conduct parallel reduction.

Figure 7:
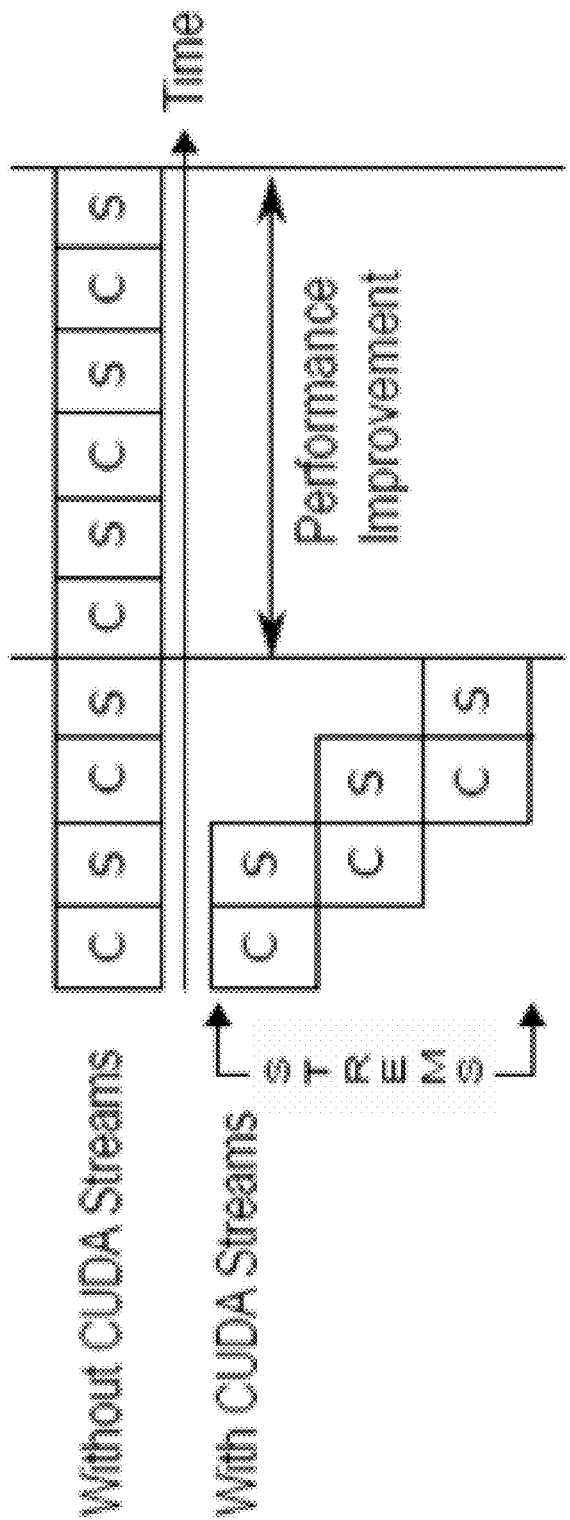
FIG. 7 illustrates an example of transferring Counter and Split arrays in FIG. 3 via CPU master to four other GPUs comparing to GPU master approach with three CUDA streams, each containing two kernels on the master GPU, according to various embodiments of the present disclosure.

In addition, to minimize the communication cost, data transfer and in-core computation should be overlapped whenever it is possible. For that purpose, a GPU mechanism called CUDA streams can be adopted to allow concurrent kernel function execution (FIG. 7). Specifically, several CUDA streams containing GPU kernel calls can be simultaneously launched via several OpenMP threads, and the data transferring is done using asynchronous direct GPU-To-GPU data transfer. In all the algorithms in this paper, whenever it is possible CUDA streams and asynchronous direct GPU-To-GPU data transfer are used to transfer data among GPUs.

Figure 6:
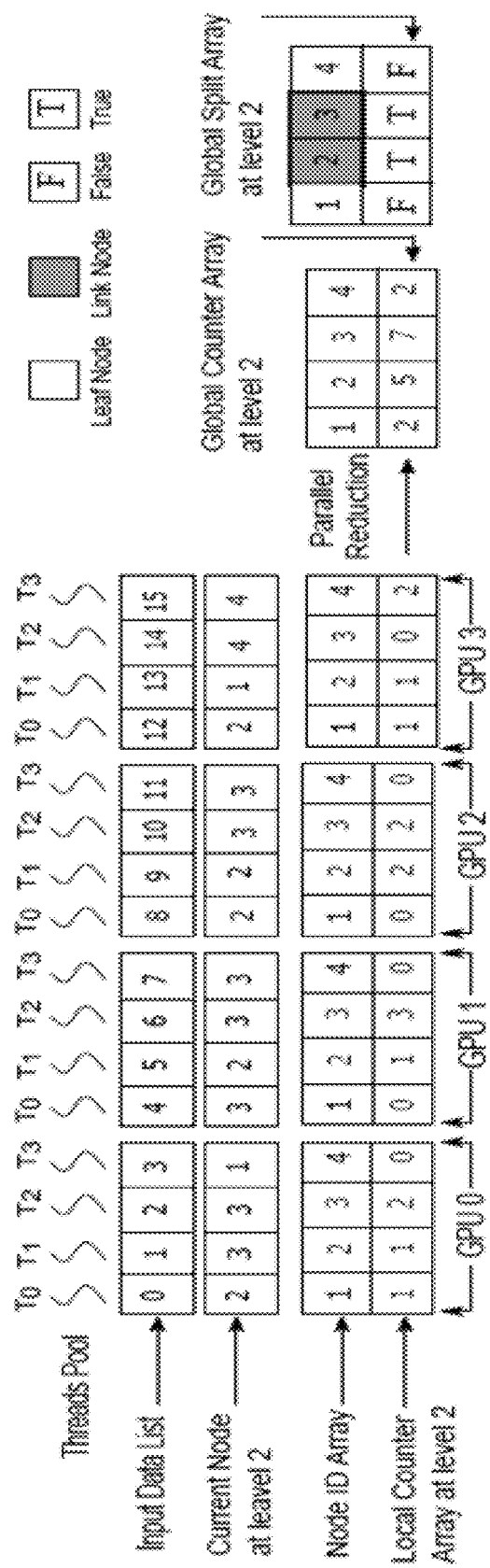
FIG. 6 illustrates an example of constructing the second level of the quadtree in FIG. 3 using four GPUs, according to various embodiments of the present disclosure.

Tree Construction Routines: Tree construction is still done in three steps. Since the input dataset size is bigger than one GPU's global memory, the input dataset should be split into multiple sets based on the number of available GPUs in a Multi-GPU cluster, and each set is assigned to one GPU. Each GPU in a work-set can work independently on finding enclosing node for points in its partition on the tree level being developed (Algorithm 2). However, in order to determine whether the tree construction needs to proceed on building the next level of the tree, the nodes' data point counters should be updated based on the total sum of the counter values in all GPUs for that level. To this end, each GPU keeps a local copy of the node ID array, counter array, and split array. Then, after building each level, the corresponding global counter value for each node in that level is updated with sum of the values from each GPU using the GPU master approach (FIG. 6).

The node creation kernel is launched on the master GPU (Algorithm 3). Since in such design all leaf node's data list cannot be stored in one GPU card, leaf node's data lists are allocated in consecutive memory locations on the available GPUs. Each leaf node on the master GPU keeps track of the physical memory location of its data list.

To insert the input data points to the data lists, each data point should be located in the same GPU's global memory as its data list. Data points in each GPU that do not meet this condition, are grouped together based on the GPU to which they belong, and are copied to their corresponding GPU—using multiple CUDA streams and direct GPU-To-GPU data transfer in parallel. Then, the Point-Insertion kernel (Algorithm 4) is launched on each GPU to insert data points to their data lists. In the final quadtree structure, each leaf node points to the beginning of its data list in the leaf nodes data list array stored on one GPU's global memory in a cluster.

As mentioned earlier, G-PICS supports the following types of spatial queries: (1) spatial point search, which retrieves data associated with a point in the data domain, (2) range search, which finds a set of data points intersect with a query shape object, (3) within-distance search, which retrieves objects within a specific distance from the search query, and (4) k-nearest neighbors, which retrieves k closest objects to a query point. G-PICS query processing algorithm is independent from the index structure (e.g., space-driven or data driven).

A typical spatial query is processed in two steps: (1) identification of leaf nodes satisfying the search conditions; and (2) examining the identified nodes to determine the final output data points. G-PICS is designed to process multiple spatial queries running concurrently. To this end, in the first step, using the traditional tree search is necessary to achieve logarithmic work efficiency. Recall that in the second step, reading the data records from GPU global memory is the main bottleneck, as the same data record can be accessed many times by different queries in a workload. To tackle these issues, G-PICS introduces a push-based paradigm for the second step of query processing. Specifically, a query list is attached to each leaf node for saving the list of queries intersecting that leaf node for processing. In the first step of query processing, queries intersecting with a leaf node are registered in the query list attached to that leaf node. In the second step, queries in each list are processed together to minimize accesses to global memory, and take advantage of the other available low-latency memories on GPUs. Two GPU kernels are designed to perform query processing: Leaf-Finding, and Leaf-List-Processing.

Figure 8:
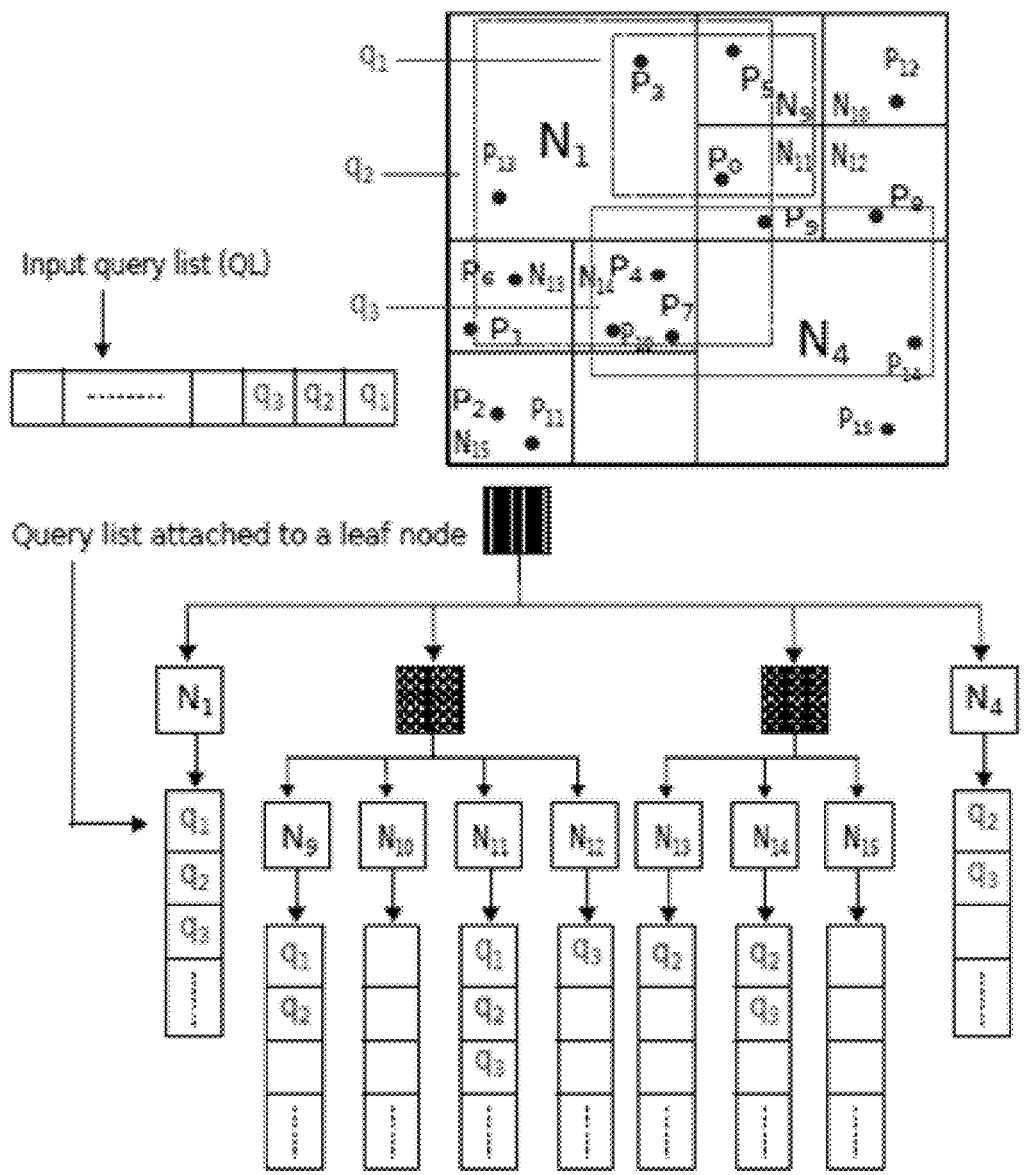
FIG. 8 illustrates an example of registering range search queries into the query lists of leaf nodes according to various embodiments of the present disclosure.

Step 1—Query Registering: For each leaf node, a query list can be maintained which contains IDs of all queries whose outputting data can be found in that leaf node. In the Leaf-Finding kernel, each thread takes one query from QL, and finds the leaf node(s) that intersect with the query search key value or range. Then, registers that query to its intersecting leaf nodes. FIG. 8 shows an example of such queries registering.

Step 2—Leaf Node Processing: The Leaf-List-Processing kernel is launched with as many GPU blocks (e.g., a group of threads) as the number of leaf nodes. Then, each registered query in the query list is assigned to one thread in that block. In order to output the results, all the queries in a leaf query list have to read the data records in that leaf node and, based on their query types, perform the required computation. Therefore, in each GPU block, if the number of registered queries is greater than one, all the data points belonging to the leaf node assigned to that GPU block are copied from global memory to shared memory. Shared memory is much faster than global memory—its access latency is about 28 clock cycles (versus global memory's 350 cycles). The copying from global memory to shared memory is not only parallelized, but also coalesced because points in each leaf node are saved in consecutive memory locations. Using this strategy, the number of accesses to each leaf node data lists in global memory are reduced to one. This is in sharp contrast to the traditional approach that retrieves each leaf node once for each relevant query. Having copied all the points in each leaf node data list to shared memory, each active thread in that block takes one query from the query list attached to its corresponding leaf, calculates the Euclidean distance between that query point and all the points in that leaf node (located in shared memory), and outputs those that satisfy the search criteria. This step is shown in Algorithm 5.

---

Algorithm 5: Leaf-List-Processing on GPU

Local Var: b (Block id), t (Thread id), M (number of points in leaf[b]), lqL (query list for leaf[b]), sL (leaf[b] data list)
1: if lqL > 1 then
2:    sL ← load lead$_{datalist}$[leaf[b]] to shared memory in parallel
3: else
4:    sL ← leaf$_{datalist}$[lead[b]] from global memory
5: end if

```
Algorithm 5: Leaf-List-Processing on GPU

6:   for each lqL[t] in parallel do
 7:     for i = 1 to M do
 8:        d ← computeSearchFunction(lqL[j], sL[i])
 9:        if d meets the search condition then
10:           Add sL[i] to the Output list of lqL[j]
11:        end if
12:     end for
13:   end for
```

Query-Specific Implementation Details: The point search, range search, and within-distance search are implemented following the 2-step approach in a straightforward way: in the first step, a within-distance search retrieves the leaf nodes falling within a specific distance from the search key; a range search retrieves the leaf nodes intersecting with the query range; a point search retrieves the leaf node that contains the query search key. Then in the second step of the search, data lists in the identified leaf nodes from the first step are examined to output the final results. The kNNs in G-PICS is treated as a within-distance search followed by a k-closest selection from the within-distance search result set. The within-distance search is initialized with a radius based on the input distribution and k. If the number of output items for a query is less than k, the within-distance search will be performed again with a larger radius.

Figure 9:
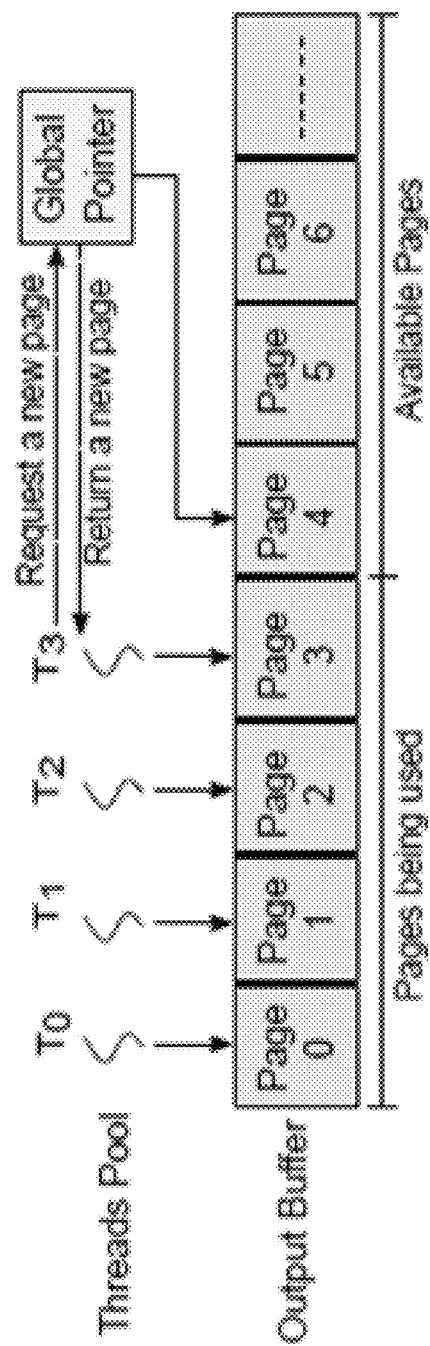
FIG. 9 illustrates an example of a direct output buffer for GPU threads, showing Thread 3 acquiring a new page as its output buffer, according to various embodiments of the present disclosure.

Outputting Results: A special challenge in GPU computing is that, in many applications, the output size is unknown when the GPU kernel is launched. Examples of such in G-PICS are the number of output results in a typical window range, or within-distance query. In CUDA, memory allocation with static size is preferred—in-thread dynamic memory allocation is possible but carries a huge performance penalty. A typical solution is to run the same kernel twice: in the first round, output size is determined. In the second run, the same algorithm will be run again and output written to the memory allocated according to the size found in the first round. In G-PICS, an efficient solution is utilized that allows the algorithms to compute and output the results in the same round for those categories of queries that their output size is unknown in advance using a buffer management mechanism. In this design, an output buffer pool with a determined size is allocated. The allocated memory is divided into pages of a particular size. In order to record the location of the first available page in the buffer pool, a global pointer (GP) is kept. Each thread gets one page from the buffer pool and outputs its results to that page. It also keeps track of its own local pointer to the next empty slot within that page. Once a thread has filled a page completely and has more results, it will get a new page from the buffer pool by increasing the GP using the GPU atomic add operation. Using this solution, conflicts among threads is minimized because the GP is updated only when a page is completely filled (FIG. 9).

Extensible Framework: G-PICS can be extended to support other spatial data retrieval algorithms and applications. For example, G-PICS can be extended to support a special type of spatial join named the 2-body constraints problem, which retrieves all pairs of objects that are closer than a user-specified distance (d) from each other. In the first step of this search, each leaf node registers itself to the query list of all other leaf nodes with distance less than or equal to d. Then, in the second step of the search all matching pairs within those leaf nodes are retrieved and outputted.

As previously discussed the tree structure for large datasets is stored on one GPU's global memory (master GPU), and the leaf nodes' data are stored in multiple GPUs. Since the tree structure is stored on the master GPU, the first step of query processing is done on the master GPU. Then, the second step is parallelized using multiple GPUs. Query processing for such datasets is done in three steps as follows:

(a) Step I—Query Registering: The Leaf-Finding kernel is done on the master GPU using the same approach mentioned in the single GPU approach.

(b) Step II—Copying query lists: In order to retrieve the final results, the query lists should be transferred to the corresponding GPUs where their intersecting leaf nodes' data lists are stored. The query list transferring is again done using multiple GPU streams and direct GPU-To-GPU transfer.

(c) Step III—Leaf Node Processing: To process the registered queries in the query list of the leaf nodes on each GPU, the Leaf-List Processing kernel (Algorithm 5) is launched with as many GPU blocks as the number of leaf nodes stored on that GPU to output the query results.

G-PICS provides an efficient parallel update algorithm to support dynamic datasets on GPUs. Data movement may change the tree structure—it can be viewed as a deletion followed by an insertion. Both operations are costly because dynamic memory allocation at kernel runtime carries an extremely high overhead on GPUs, especially when there are group movements. At the end of each move, a data point can either stay in the same leaf node, or move into another node (red points in FIG. 10). After processing all updates, the number of points in some leaf nodes may exceed MC. Consequently, if MH has not reached, the nodes should be partitioned, and points in them moved to their children (N1). Alternatively, neighboring leaf nodes could lose data points and should be merged together (N9; N10; N11, and N12). Moreover, in space-driven partitioning G-PICS trees, empty nodes are not materialized; therefore, there may be cases that points move into an empty node (P10) that needs to be materialized on-the-fly (N16).

The easiest solution is to build the tree from scratch. However, this solution is inefficient in that all the data will be processed regardless of the amount of data movement. Therefore, the goal is to design an update procedure with running time proportional to the intensity of data movement.

Figure 11:
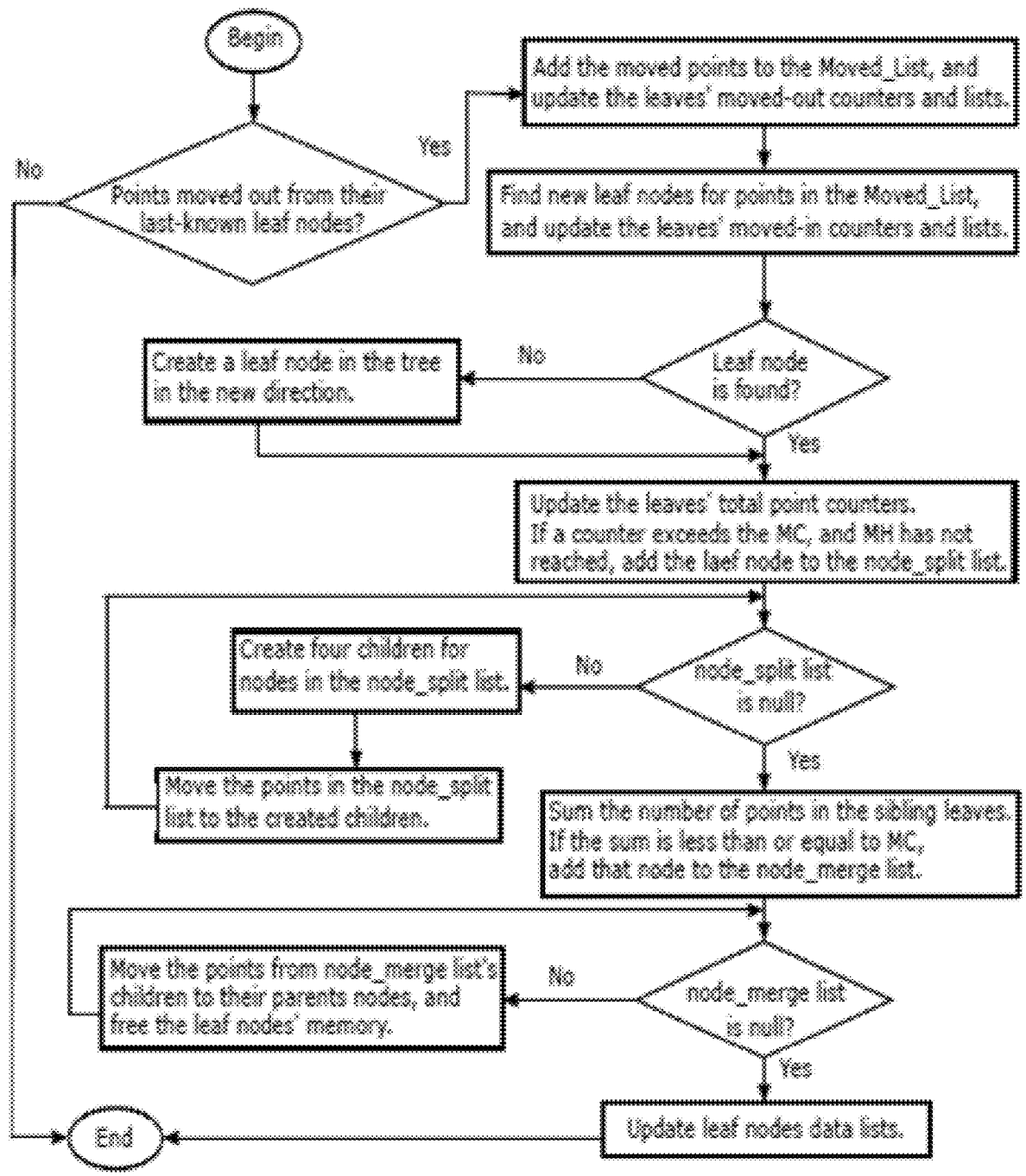
FIG. 11 illustrates an example of a tree update procedure in G-PICS, according to various embodiments of the present disclosure.

We design a bottom-up parallel algorithm on GPUs to bulk update the tree under both data-driven and space-driven partitioning mechanisms. This, again, reflects the strategy of concurrent processing of queries except now a query is an update. At first, the new position of all the input data points are checked in parallel to see if they moved out from their last-known leaf node. If there is at least one movement, the tree structure should be updated accordingly. Several GPU kernels are designed to update the tree in parallel on GPU as follows: Movement-Check, Leaf-Finding, Node-Partitioning, Node-Merging, and Leaf-Lists-Update. Two counters, and two lists are added to each leaf node to keep track of points moved-in or moved-out during the update procedure. The work-flow of the entire tree update procedure is shown in FIG. 11.

The Movement-Check kernel checks if each data point has moved out from its last-known leaf node. This kernel is launched with N threads. Each thread takes a point, and checks if the point has moved out from its last-known leaf node. In case of a movement, the corresponding thread adds the point to the list of moved data points (Moved_List), and update the counters and lists associated with the last-known leaf node.

The Leaf-Finding kernel is called if Moved_List is not empty. This kernel is launched with as many threads as the number of points in Moved_List. Each thread finds the new leaf node its assigned point moved in, and updates the relevant counters and lists associated with that leaf node. If updating the number of points in a leaf node makes it qualified for partitioning, that node is added to the node_split list. In case of moving to empty nodes in space-driven partitioning trees, new nodes are first created in parallel, and afterwards points are added to the newly-created nodes.

With a non-empty node_split list, the Node-Partitioning kernel is called to split the nodes in parallel. There are two groups of points that may belong to such nodes: points that previously belonged to those nodes and did not move out, and points from Moved_List that moved to those nodes. These are called Candidate_Points. To maximize the efficiency in moving points from the partitioned nodes to the data list of the newly-built child nodes, only Candidate_Points are checked.

On the other hand, while some nodes are to be partitioned, there may be other nodes that have to be merged. Except the leaf nodes that get partitioned, other leaf nodes have the potential of getting merged. The Node-Merging kernel considers those leaf nodes by checking the sum of the counters of sibling leaves. If the total number of points in those nodes become less than or equal to MC, they are added to the node_merge list. Siblings in this list are merged together, and their data points moved to their parent, which becomes a new leaf. The algorithm of moving points in these nodes is similar to the one in Node-Partitioning kernel.

To update the leaf nodes' data lists, a data point can be reinserted from scratch. However, this approach does more work than necessary, especially under low data movement—any data movement would cause the entire data list rebuilt, which is the dominant cost. To increase efficiency, a memory allocation method for the data lists with the aforementioned page-based mechanism is designed as follows: first the leaf nodes that are affected by update procedure are identified. Then, only the data lists in those nodes are updated by calling Leaf-Lists-Update kernel, which assigns each leaf node to a GPU block. If in a leaf node the number of moved-in points is greater than moved out points, then a new page is allocated to store the points moved into that node.

The total cost of the update procedure can be expressed as:

$$C = C_M + C_L + C_V + C_D \quad (3)$$

where $C_M$ is the cost of running Movement-Check, $C_L$ the cost of Leaf-Finding, $C_V$ the cost of updating the tree nodes, and $C_D$ the cost of updating leaf nodes' data list. If $\alpha$ is the percent of points that moved out from the last-known leaf nodes, $\beta$ is the percent of modified tree nodes, and $\gamma$ is the percent of leaf nodes whose data lists have been modified as the result of the update, then $C_L = O(\alpha N \log N)$ and $C_V = O(\beta n)$ in both updating approaches, which are proportional to the level of data movement. However, $C_D = O(\gamma \alpha N)$ in paging approach, and $C_D = O(N)$ non-paging approach. As discussed in Equation (1), $C_D$ is the dominating cost. Since this cost is proportional to the level of data movement in paging approach, it is expected that this approach shows better performance.

We also modified the bulk update procedure to support updates in multiple GPUs. To that end, the tree node structure (not including the data lists) replicates into all the available GPUs in the cluster. A local copy of counters and lists for keeping track of the movements are assigned to each copy on each GPU. Then, the new positions of points are sent to the GPUs to start the update procedure. Beside the kernels mentioned in the single GPU environment, two other kernels are designed to fulfill the task in a Multi-GPU environment: Node-Counter-Updating, and Data-Points-Transferring.

The Movement-Check kernel is launched on each GPU with as many threads as the number of points assigned to that GPU followed by Leaf-Finding kernel call if Moved_List is not empty. To update the total number of points that moved in/out of a node, the local counter values are transferred to the master GPU for parallel reduction. Then, the Node-Counter-Updating kernel is called on the master GPU for updating the actual counter values in each node, and updating the node_split list.

The Node-Creation, Node-Partitioning and Node-Merging kernels are executed on the master GPU if the prerequisites for calling those kernels are satisfied. Then, finding the new location for points in the modified nodes is done using the GPUs where the data lists are stored.

Having finished all these steps, the data lists can be updated. As neighboring leaf nodes' data lists are most likely stored in the same GPU, data movement can be handled without communications between two GPUs. However, if there are points that move to a leaf node residing in another GPU, they will be transferred to corresponding GPUs using Data-Points-Transferring kernel before updating the leaf nodes data lists. Then, Leaf-Lists-Update kernel is called to update the data lists. This can be done using the page-based or reinsertion mechanism mentioned in the single-GPU approach.

Experimental Evaluations

In this section, empirical evaluation of G-PICS performance is presented. For that, a CUDA version of G-PICS is implemented that includes algorithms for processing the following search queries: window-based range, within-distance, kNNs, and point search. Experiments were conducted on a workstation running Linux (Ubuntu 16.04 LTS) with an Intel Core i9-7920X 2.90 GHz CPU with 12 cores, 64 GB of DDR4 3200 MHz memory, equipped with four NVIDIA Tesla P100 GPU cards with 16 GB global memory in each card. All implementations in G-PICS and evaluation benchmarks are highly optimized in terms of efficient use of registers, choosing the best block size in each GPU kernel. All the experiments are conducted over a real dataset generated from a large-scale molecular simulation study of a lipid bi-layer system. This data contains coordinates for 268,000 atoms recorded over 100,000 time instances to generate data of an arbitrarily large size for experimental purposes. In the following text, the absolute and relative total processing time (e.g., speedup) used for processing supported algorithms within G-PICS over various baseline programs are analyzed.

Figure 12:
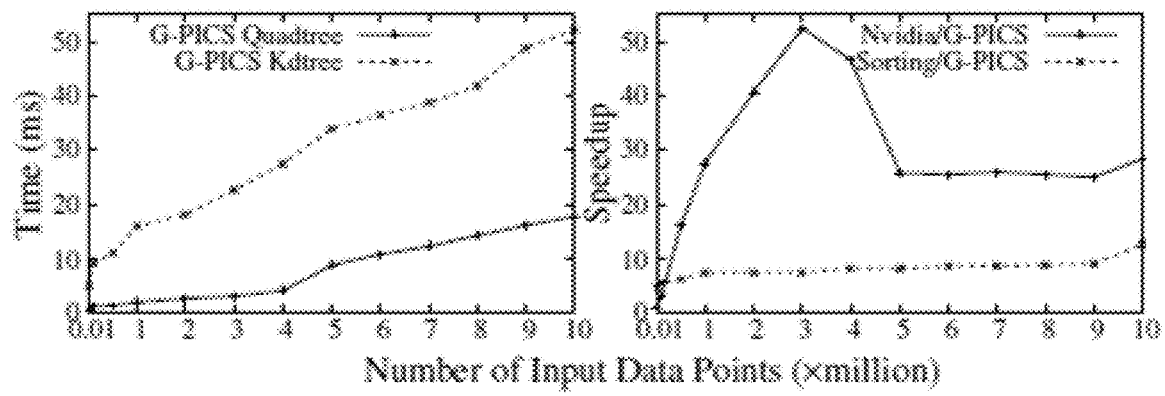
FIG. 12 illustrates the time for tree construction in G-PICS, and its speedup over NVIDIA and kdtree-Sorting using CUDA Thrust library, according to various embodiments of the present disclosure.

In such experiments, only the tree construction time is measured and compared. G-PICS tree construction is compared with the parallel tree construction developed by NVIDIA. G-PICS kdtree construction performance is evaluated by comparing with parallel kdtree construction based on sorting all data points using the CUDA Thrust library. FIG. 12 shows the G-PICS quadtree and kdtree construction time, and speedup over comparative programs. As shown, G-PICS quadtree clearly outperforms the NVIDIA code (up to 53×) in all cases. By increasing the number of input data points, G-PICS speedup increases, and it remains constant at very large input datasets. While building the tree in G-PICS, if MH is reached, a leaf node could accommodate more points than MC. Under the same situation, the NVIDIA code crashes. Moreover, G-PICS does not materialize the empty nodes, while NVIDIA suffers from empty node expansion. Likewise, G-PICS kdtree construction beats the tree construction using sorting (up to 13×) in all cases.

STIG and GAT are not designed to support concurrent query processing for large number of queries. Queries have to be put into a queue and processed one after another. As a result, GPICS shows a huge performance improvement over STIG and GAT. For a meaningful evaluation, G-PICS is compared with the following three baseline algorithms: (1) a parallel CPU algorithm (P-CPU) implemented based on OpenMP. Note that P-CPU is highly optimized, and performs a parallel traditional tree search in Step I of query processing to bear the logarithmic work efficiency. Additional techniques for improving the P-CPU performance using OpenMP are applied including: choosing the best thread affinity for the thread scheduler, best thread scheduling mode, and best number of active threads; (2) M-STIG and (3) M-GAT, which are task parallel GPU programs for processing multiple queries at a time. Specifically, in Step I of query processing, M-GAT performs a parallel tree search on the CPU. Therefore, M-GAT performs the same as P-CPU in Step I for processing multiple queries concurrently. Then, the list of intersecting leaf nodes for queries are transferred to GPU. In Step II of the search, MGAT parallelizes each query separately on GPUs. Hence, MGAT performs the same as M-STIG in Step II for processing multiple queries concurrently. As the query processing is done in two steps, the total running time and that in each step (Step I and II) are compared. Note that the total time is end-to-end query processing time. This includes the time to ship query list into and the query results out of the GPU. This allows a fair comparison to P-CPU, which does not have such CPU-to-GPU transmission costs. The experiments in this section are run under the input dataset size of 16.5 million points, which are indexed by a quadtree with MC and MH equal to 1024 and 14, respectively. The query processing performance is evaluated under different numbers of concurrent queries (up to 4M). Since the output size of a typical range search and within-distance search is unknown in advance, the buffer pool solution is used for outputting the query results in G-PICS, M-GAT and M-STIG.

Figure 13:
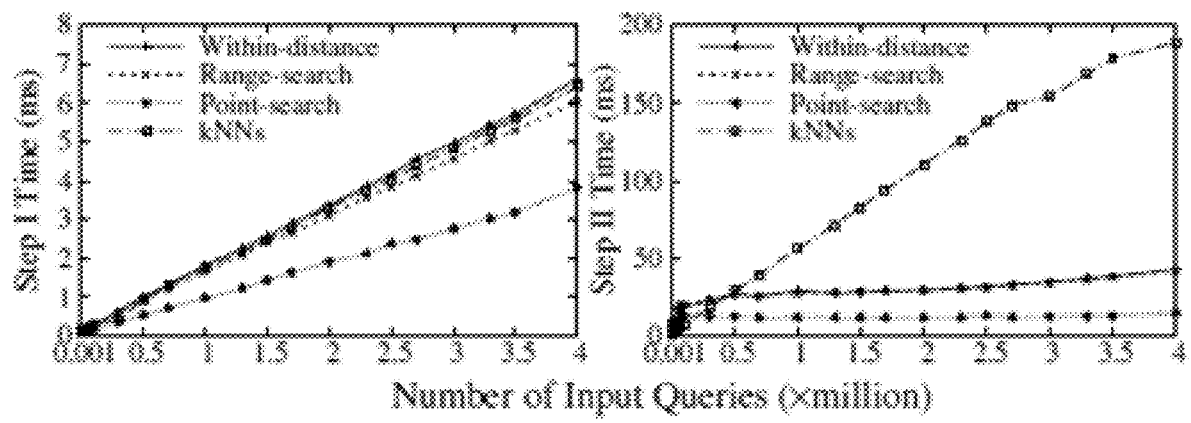
FIG. 13 illustrates the processing time for search queries in G-PICS, according to various embodiments of the present disclosure.
Figure 14:
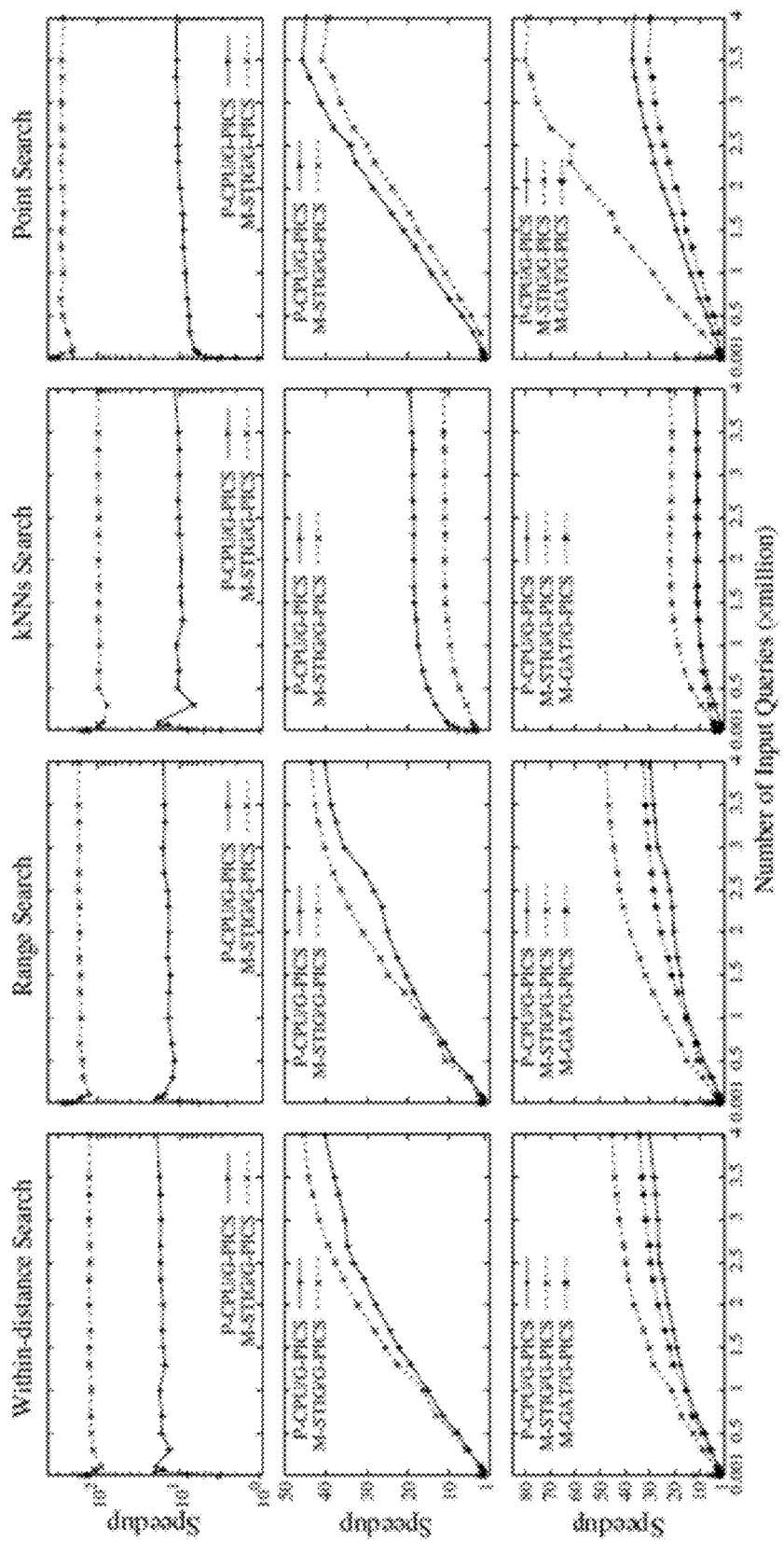
FIG. 14 illustrates an example of the Speedup of G-PICS over M-STIG, M-GAT, and P-CPU in processing 1,000 to 4,000,000 queries, according to various embodiments of the present disclosure.

The absolute processing time of queries in G-PICS is shown in FIG. 13. The same selection kernel for finding kNNs in G-PICS and M-STIG is implemented. For all 4 types of queries in both Steps, the processing time increases linearly with the number of concurrent queries. However, the time for running Step II dwarfs that for Step I therefore contributes more to the total processing time. FIG. 14 shows the performance speedup of G-PICS over P-CPU, M-GAT, and MSTIG in processing different search queries. The logarithmic tree search in Step I noticeably outperforms the brute-force leaf search under all circumstances (more than 100× average speedup). The performance speedup over M-GAT and PCPU in Step I is less remarkable (up to 20×) comparing to those over M-STIG. Such performance boost over M-STIG is certainly in conformity with the advantage of logarithmic tree search. Since there is less computation involved in processing Step I of the point search queries (each query just intersects with one leaf node), the speedup reaches a very high level (up to 300×). Generally, Step II speedup of G-PICS is not as high as that in Step I (up to 46×). It starts with a small number under low concurrency, then increases linearly with the number of input queries, and levels off afterwards. Such an increase of speedup is the result of using shared memory for holding data—the savings caused by caching are higher with more queries. When the shared memory bandwidth is fully utilized, the speedup levels off. As Step II dominates, the trends of speedup in total running time are similar to those found in Step II—even by considering the cost of transferring outputs back to CPU, G-PICS outperforms P-CPU remarkably.

As a special note, although G-PICS is designed for query processing systems with high query arrival rate, its performance under low concurrency still outperforms the M-SITG and M-GAT. However, G-PICS performance is in par (or slightly lower) than that of P-CPU. This is because the number of threads is small under low query concurrency. As a result, only a portion of the GPU resources, e.g., 5000 cores, are able to be utilized.

Figure 15:
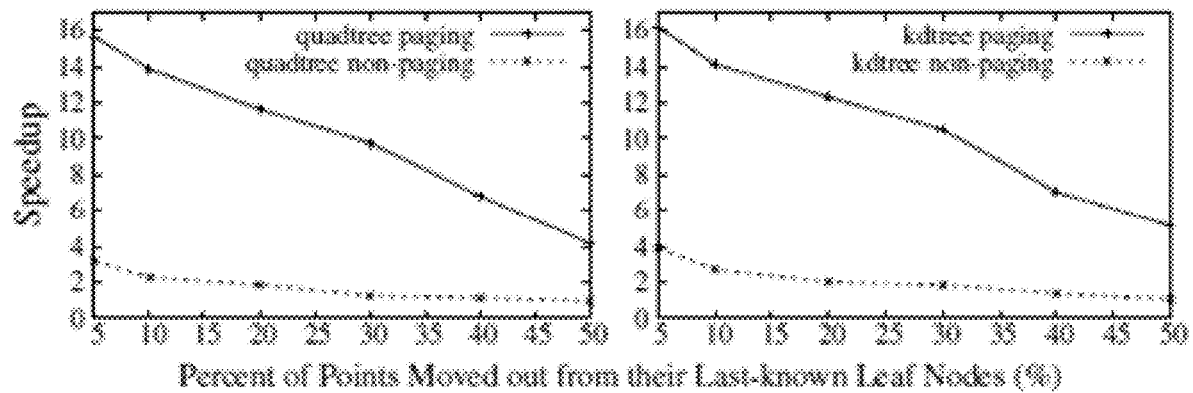
FIG. 15 illustrates an example of G-PICS update performance over Scratch, according to various embodiments of the present disclosure.

To evaluate the performance of the tree update procedure, the positions of a certain percentage of the input data points can be changed to new randomly-generated positions. Then, the tree is updated accordingly. To measure the performance, the percent of the input data point that moved out from their last-known leaf nodes is captured. Then, the time it takes to update the tree is compared with that of building the tree from scratch using G-PICS tree construction code (we refer to it as Scratch hereafter). FIG. 15 shows the speedup of the tree update algorithm using paging and nonpaging approaches over Scratch. For both approaches, G-PICS outperforms Scratch. As expected, with the increase of the intensity of data movement, the update performance decreases. Furthermore, the paging approach outperforms non-paging approach remarkably, even under very high level of movement. The experimental results are in compliance with update cost in Equation 3, which confirms the dominating cost in paging approach is proportional to the intensity of data movement.

The multi-GPU algorithms allow for handling data with much larger sizes. In this paper, Multi-GPU algorithms are evaluated with a focus on performance scalability. For that purpose, a dataset is used that can fit into one GPU's global memory but distribute it to multiple GPUs. The experiments are conducted by using one to four GPUs.

Figure 16:
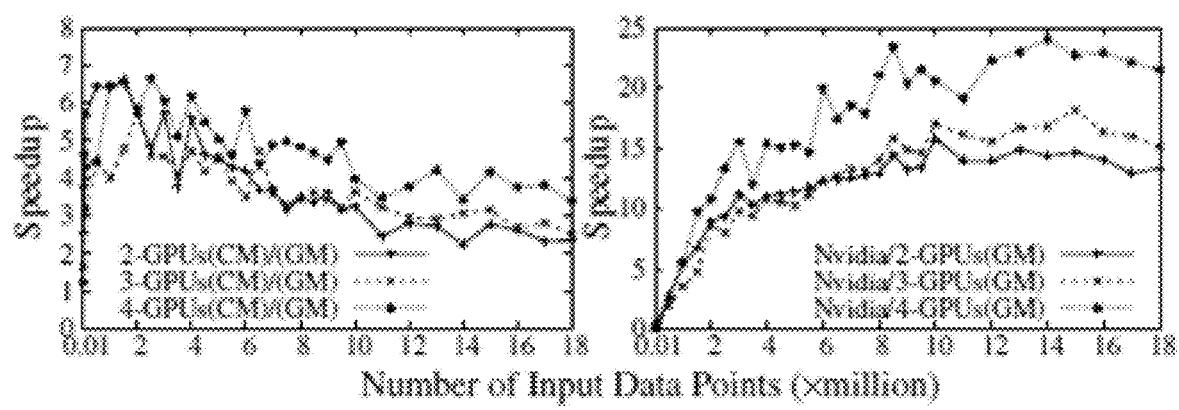
FIG. 16 illustrates an example of Speedup of G-PICS tree construction using GM over using CM and NVIDIA code in a multi-GPU system, according to various embodiments of the present disclosure.

As discussed, the tree can be built in G-PICS via a GPU master (GM) or a CPU master ($C_M$) approach. As expected, the GM approach shows much better performance than $C_M$ (FIG. 16, left). GM shows at least a 2.5× speedup over $C_M$ under all numbers of GPUs. FIG. 16 (right) shows the performance of GM over the NVIDIA single GPU tree construction code. With increasing sizes of input data, the performance speedup over NVIDIA becomes more remarkable. In addition, the performance of G-PICS increases as more GPUs are used, indicating good scalability.

Figure 17:
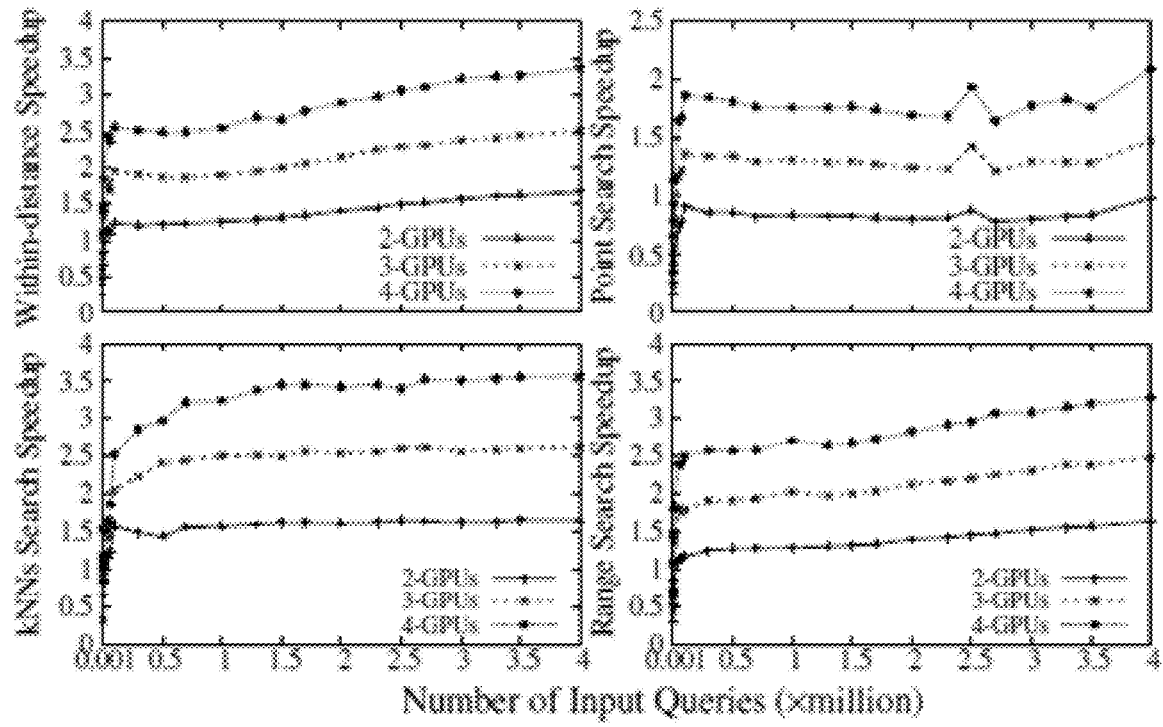
FIG. 17 illustrates an example of G-PICS multi-GPU spatial query processing speedup over a single GPU, according to various embodiments of the present disclosure.

Results related to the performance of spatial query processing algorithms under multiple GPUs are shown in FIG. 17, in which the speedup of the algorithm running on 2-4 GPUs over that of a single GPU is plotted. In such experiments, performance is gained by distributing the computational workload to more GPUs while at the same time introducing data transmission overhead. A speedup higher than 1× is achieved when the gain overshadows the overhead. When two GPUs are used, the speedup is close to 1.5× for within-distance, kNNs, and range search queries while it goes slightly below 1× for point search. This is because the demand for in-core computation for the point search is low thus the communication cost dominates. However, when three or four GPUs are used, the performance increases significantly for all four query types. With four GPUs, the speedup reached 3.4× for within-distance, 3.5× for kNNs, 3.3× for range search, showing an (almost) linear scalability. For reasons mentioned above, the largest speedup for point search is only about 2×. In all query types, the speedup increases slightly or stays the same with the increase of the number of input queries.

Figure 18:
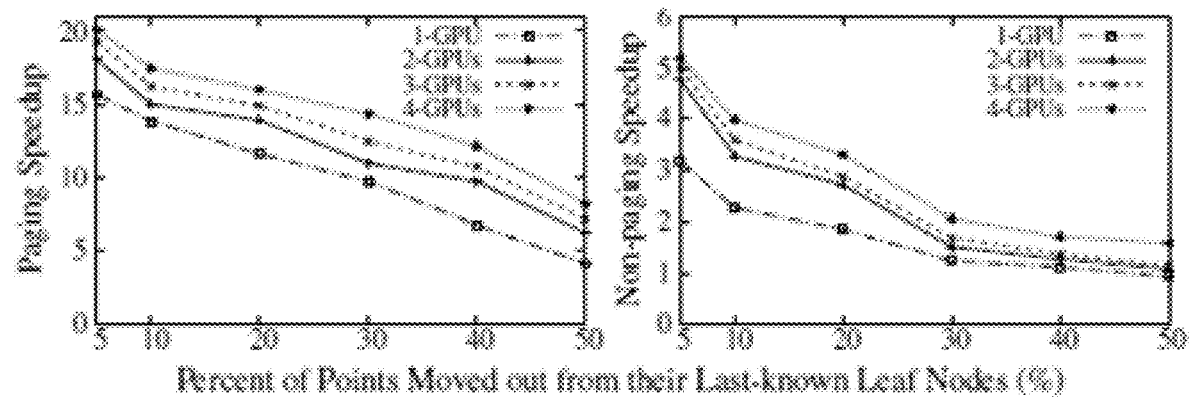
FIG. 18 illustrates an example of G-PICS multi-GPU update performance over Scratch, according to various embodiments of the present disclosure.

To measure the efficiency of Multi-GPU tree updates in G-PICS, both paging and nonpaging approaches are implemented and performance are evaluated against Scratch under the same set-up, e.g. tree update performance under four GPUs is measured against Scratch using four GPUs. According to FIG. 18, the paging approach outperforms the non-paging approach using Multi-GPU with a similar trend as a single GPU. This is again in compliance with the update cost in Equation (3). Due to high communication cost among multiple GPUs, the multi-GPU update procedure is less scalable than query processing algorithms.

Figure 19:
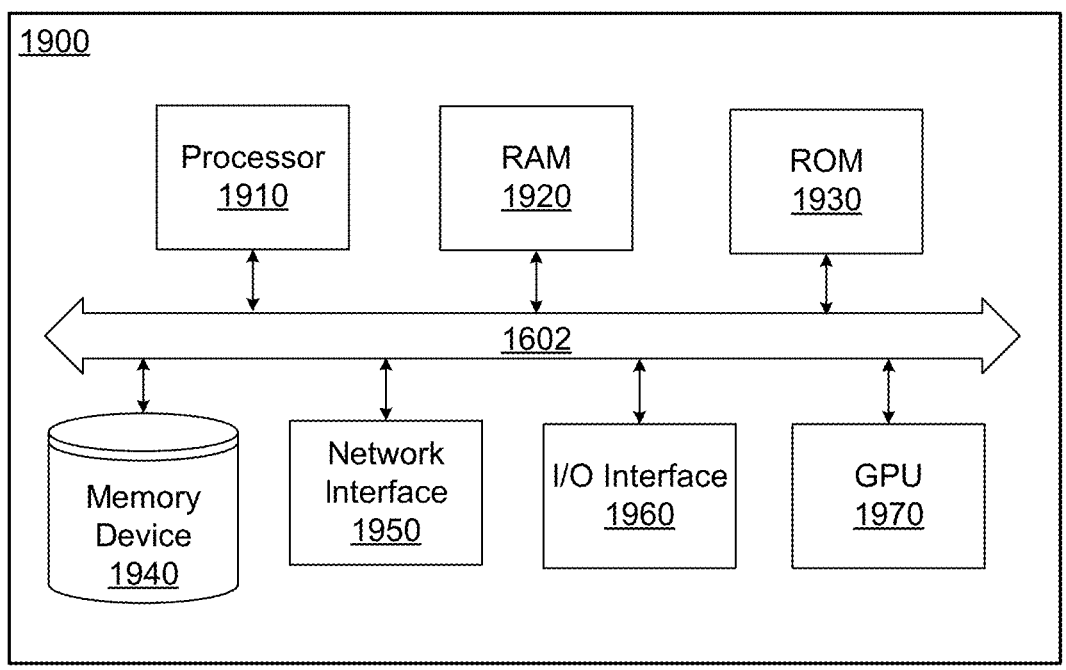
FIG. 19 is a schematic block diagram that illustrates an example computing environment employed in the networked environment of FIG. 1 according to various embodiments.

Turning to FIG. 19, an example hardware diagram of a computing device 1900 is illustrated. Any of the functionality may be implemented, in part, using one or more elements of the computing device 1900. The computing device 1900 can include one or more of a processor 1910, a Random Access Memory ("RAM") 1920, a Read Only Memory ("ROM") 1930, a memory device 1940, a network interface 1950, an Input Output ("I/O") interface 1960, and one or more graphics processing units 1970. The elements of the computing device 1900 are communicatively coupled via a bus 1902.

The processor 1910 can include an arithmetic processor, Application Specific Integrated Circuit ("ASIC"), or other types of hardware or software processors. The RAM and ROM 1920 and 1930 can include a memory that stores computer-readable instructions to be executed by the processor 1910. The memory device 1930 stores computer-readable instructions thereon that, when executed by the processor 1910, direct the processor 1910 to execute various aspects of the present disclosure described herein. When the processor 1910 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 1930 comprises one or more of an optical disc, a magnetic disc, a semiconductor memory (e.g., a semiconductor, floating gate, or similar flash based memory), a magnetic tape memory, a removable memory, combinations thereof, or any other known memory means for storing computer-readable instructions. The network interface 1950 can include hardware interfaces to communicate over data networks. The I/O interface 1960 can include device input and output interfaces such as keyboard, pointing device, display, communication, and other interfaces. The bus 1902 can electrically and communicatively couple the processor 1910, the RAM 1920, the ROM 1930, the memory device 1940, the network interface 1950, and the I/O interface 1960, so that data and instructions may be communicated among them.

In operation, the processor 1910 is configured to retrieve computer-readable instructions stored on the memory device 1940, the RAM 1920, the ROM 1930, or another storage means, and copy the computer-readable instructions to the RAM 1920 or the ROM 1930 for execution, for example. The processor 1910 is further configured to execute the computer-readable instructions to implement various aspects and features of the present disclosure. For example, the processor 1910 may be adapted and configured to execute the processes described above. Also, the memory device 1940 may store various data discussed herein.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A system comprising:
   a graphics processing unit; and
   a central processing unit communicably coupled to the graphics processing unit, the central processing unit configured to at least:
     determine a number of nodes in a tree to be partitioned for a dataset comprising a plurality of data points;
     iteratively initiate performance of a partition of the tree via the graphics processing unit;
     initiate performance of a node creation on the graphics processing unit; and
     initiate performance of a point insertion on the graphics processing unit;
   the graphics processing unit configured to at least:
   associate each of a plurality of threads with a respective data point of the plurality of data points;
   (i) determine, for each thread, a child node in a current tree level to which the data point associated with the thread belongs;
   (ii) update a counter associated with each child node of a plurality of child nodes, wherein the counter is configured to maintain a count of the number of data points associated with the child node;
   (iii) subsequent to updating each of the plurality of counters, identify child nodes for which the count exceeds a predetermined threshold;
   (iv) repeat (i) to (iii) for data points associated with child nodes having a count that exceeds the predetermined threshold until a stopping condition is reached;
   subsequent to reaching the stopping condition, associate each of a second plurality of threads with a respective non-empty leaf node of a plurality of non-empty leaf nodes;
   allocate, for each thread associated with a leaf node, memory for each data point associated with the leaf node; and associate each data point with a memory allocated to the data point, such that each leaf node points to a beginning of memory allocated to points associated with the leaf node.

2. The system of claim 1, wherein the graphics processing unit is further configured to at least perform a tree partition based at least in part on finding a position of an input in children of a node and performing a split of the input in the children of the node.

3. The system of claim 1, wherein the graphics processing unit is further configured to perform a plurality of node creations in parallel using the plurality of threads.

4. The system of claim 1, wherein the graphics processing unit is further configured to perform the node creation by allocating consecutive memory in an array.

5. The system of claim 1, wherein the partition of the tree is iteratively performed for each level of the tree.

6. The system of claim 1, wherein the node creation is performed by the graphics processing unit in response to a determination that the leaf node will represent a non-empty node.

7. The system of claim 1, wherein each of the plurality of data points comprises a two-dimensional data point, and wherein the point insertion comprises:
   inserting a value associated with a first dimension of each data point into a first array; and
   inserting a value associated with a second dimension of each data point into a second array.

8. A method comprising:
   determining, via a central processing unit, a number of nodes to be partitioned;
      iteratively performing, via a graphics processing unit, a tree partition, wherein performing the tree partition comprises:
         associating each of a plurality of threads with a respective data point of the plurality of data points;
         (i) determining, for each thread, a child node in a current tree level to which the data point associated with the thread belongs;
         (ii) updating a counter associated with each child node of a plurality of child nodes, wherein the counter is configured to maintain a count of the number of data points associated with the child node;
         (iii) subsequent to updating each of the plurality of counters, identifying child nodes for which the count exceeds a predetermined threshold; and
         (iv) repeating (i) to (iii) for data points associated with child nodes having a count that exceeds the predetermined threshold until a stopping condition is reached;
   performing, via the graphics processing unit, a node creation, wherein performing node creation comprises:
      subsequent to reaching the stopping condition, associating each of a second plurality of threads with a respective non-empty leaf node of a plurality of non-empty leaf nodes; and
      allocating, for each thread associated with a leaf node, memory for each data point associated with the leaf node; and
   performing point insertion on the graphics processing unit, wherein performing point insertion comprises associating each data point with a memory allocated to the data point, such that each leaf node points to a beginning of memory allocated to points associated with the leaf node.

9. The method of claim 8, further comprising performing, via the graphics processing unit, a tree partition based at least in part on finding a position of an input in children of a node and performing a split of the input in the children of the node.

10. The method of claim 8, further comprising performing, via the graphics processing unit, a plurality of node creations in parallel using the plurality of threads.

11. The method of claim 8, further comprising performing, via the graphics processing unit, the node creation by allocating consecutive memory in an array.

12. The method of claim 8, wherein the partition of the tree is iteratively performed for each level of the tree.

13. The method of claim 8, wherein performing the node creation occurs in response to a determination that the leaf node will represent a non-empty node.

14. The method of claim 8, wherein each of the plurality of data points comprises a two-dimensional data point, and wherein the point insertion comprises:
   inserting a value associated with a first dimension of each data point into a first array; and
   inserting a value associated with a second dimension of each data point into a second array.

15. A non-transitory, computer-readable medium comprising machine readable instructions that, when executed by at least one processor, cause a computing device to at least:
   determine a number of nodes to be partitioned;
   iteratively initiate performance of a tree partition via a graphics processing unit;
   associate each of a plurality of threads with a respective data point of the plurality of data points;
   (i) determine, for each thread, a child node in a current tree level to which the data point associated with the thread belongs;
   (ii) update a counter associated with each child node of a plurality of child nodes, wherein the counter is configured to maintain a count of the number of data points associated with the child node;
   (iii) subsequent to updating each of the plurality of counters, identify child nodes for which the count exceeds a predetermined threshold; and
   (iv) repeat (i) to (iii) for data points associated with child nodes having a count that exceeds the predetermined threshold until a stopping condition is reached;
   initiate performance of a node creation on the graphics processing unit;
   associate each of a second plurality of threads with a respective non-empty leaf node of a plurality of non-empty leaf nodes; and
   allocate, for each thread associated with a leaf node, memory for each data point associated with the leaf node;
   initiate performance of a point insertion on the graphics processing unit; and
   associate each data point with a memory allocated to the data point, such that each leaf node points to a beginning of memory allocated to points associated with the leaf node.

16. The non-transitory, computer-readable medium of claim 15, wherein the graphics processing unit is configured to at least perform a tree partition based at least in part on finding a position of an input in children of a node and performing a split of the input in the children of the node.

17. The non-transitory, computer-readable medium of claim 15, wherein the graphics processing unit is configured to perform a plurality of node creations in parallel using the plurality of threads.

18. The non-transitory, computer-readable medium of claim 15, wherein the graphics processing unit is configured to perform the node creation by allocating consecutive memory in an array.

19. The non-transitory, computer-readable medium of claim 15, wherein the partition of the tree is iteratively performed for each level of the tree.

20. The non-transitory, computer-readable medium of claim 15, wherein the node creation is performed by the graphics processing unit in response to a determination that the leaf node will represent a non-empty node.

* * * * *